(12) United States Patent
Zagaynov et al.

(10) Patent No.: US 10,115,036 B2
(45) Date of Patent: Oct. 30, 2018

(54) DETERMINING THE DIRECTION OF ROWS OF TEXT

(71) Applicant: ABBYY Development LLC, Moscow (RU)

(72) Inventors: Ivan Germanovich Zagaynov, Moscow Region (RU); Vladimir Yurievich Rybkin, Moscow (RU)

(73) Assignee: ABBYY Development LLC, Moscow (RU)

( * ) Notice: Subject to any disclaimer, the term of this patent is extended or adjusted under 35 U.S.C. 154(b) by 168 days.

(21) Appl. No.: 15/184,448

(22) Filed: Jun. 16, 2016

(65) Prior Publication Data
US 2017/0364770 A1 Dec. 21, 2017

(30) Foreign Application Priority Data
Jun. 15, 2016 (RU) ................................ 2016123484

(51) Int. Cl.
G06K 9/62 (2006.01)
G06K 9/66 (2006.01)
G06K 9/32 (2006.01)
G06K 9/42 (2006.01)

(52) U.S. Cl.
CPC ......... G06K 9/6212 (2013.01); G06K 9/3208 (2013.01); G06K 9/66 (2013.01); G06K 9/42 (2013.01); G06K 2209/01 (2013.01)

(58) Field of Classification Search
CPC ........... G06K 9/42; G06K 9/66; G06K 9/6212
See application file for complete search history.

(56) References Cited

U.S. PATENT DOCUMENTS

| | | | |
|---|---|---|---|
| 5,592,572 A | 1/1997 | Le | |
| 6,567,797 B1* | 5/2003 | Schuetze | G06F 17/3061 |
| 6,865,290 B2* | 3/2005 | Kohchi | G06K 9/00456 382/165 |
| 8,249,343 B2 | 8/2012 | Perronnin et al. | |
| 9,014,479 B2 | 4/2015 | Chulinin | |
| 2012/0274991 A1* | 11/2012 | Roy | H04N 1/387 358/462 |
| 2015/0262007 A1* | 9/2015 | Sesum | G06K 9/00469 382/177 |
| 2017/0364770 A1* | 12/2017 | Zagaynov | G06K 9/42 |

FOREIGN PATENT DOCUMENTS

| | | |
|---|---|---|
| EP | 2178028 A2 | 4/2010 |
| JP | 5149259 B2 | 2/2013 |

\* cited by examiner

*Primary Examiner* — Gregory M Desire
(74) *Attorney, Agent, or Firm* — Lowenstein Sandler LLP

(57) ABSTRACT

A page orientation component of an image processing device receives an image of a document, transforms the image to a binarized image by performing a binarization operation on the image, and identifies a portion of the binarized image that comprises one or more rows of textual content. The page orientation component identifies a plurality of horizontal runs of white pixels and a plurality of vertical runs of white pixels in the one or more rows of textual content in the portion of the binarized image. The page orientation component generates a first histogram for the plurality of horizontal runs of white pixels, and a second histogram for the plurality of vertical runs of white pixels, and determines an orientation of the one or more rows of textual content in the image based on the first histogram and the second histogram.

45 Claims, 12 Drawing Sheets

DETERMINING THE DIRECTION OF ROWS OF TEXT

CROSS REFERENCE TO RELATED APPLICATIONS

The present application claims the benefit of priority under 35 USC 119 to Russian Patent Application No. 2016123484, filed Jun. 15, 2016; the disclosure of which is herein incorporated by reference in its entirety for all purposes.

TECHNICAL FIELD

The present disclosure is generally related to computer systems, and more particularly, to determining page orientation in images.

BACKGROUND

Optical Character Recognition (OCR) is the electronic conversion of scanned or photographed images of typewritten or printed text into computer-readable text. OCR is a common method of digitizing printed texts so that they can be electronically edited, searched, displayed on-line, and used in processes such as text-to-speech, data extraction, and text mining. Photographing pages of a document can result in a distorted perspective or geometric distortion of the pages of the document. For OCR processing to complete correctly, the orientation of rows of text in document image may need to be identified in order to correct distorted perspective prior to conducting OCR processing.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for determining the direction of rows of textual content in an image of a document. Photographing pages of a document can result in a distorted perspective or geometric distortion of the pages of the document. For OCR processing to complete correctly, the orientation of rows of text in a document image may need to be identified in order to correct distorted perspective prior to conducting OCR processing. Typical methods for determining orientation of rows of text in a document image may involve the execution of OCR processing with document analysis to identify characters in the image. The OCR document analysis may then determine the page orientation based on the orientation of characters recognized by the OCR processing with document analysis. The use of OCR to determine the orientation of rows of text can be resource intensive and inefficient since the process may need to determine orientation of individual recognized characters in textual content blocks to identify distorted perspective in rows of text.

Aspects of the present disclosure address the above noted and other deficiencies by using a mechanism that identifies the orientation of rows of text in an image of a document without using OCR processing and document analysis to identify and recognize specific characters in the text. An image of a document is analyzed to identify the area of the image most likely to contain textual content. Then, horizontal and vertical runs of white pixels are identified in the image and histograms are created for both the horizontal and vertical runs. The orientation of the textual content in the image of the document may be determined by analyzing the information from the histograms for the horizontal and vertical runs of white pixels.

Aspects of the present disclosure are thus capable of identifying the orientation of rows of textual content in an image of a document more efficiently by reducing the time required and processing resources used by OCR to identify character orientation. Moreover, subsequent OCR processing can be improved since OCR processing with document analysis should not need to determine page orientation.

Figure 1:
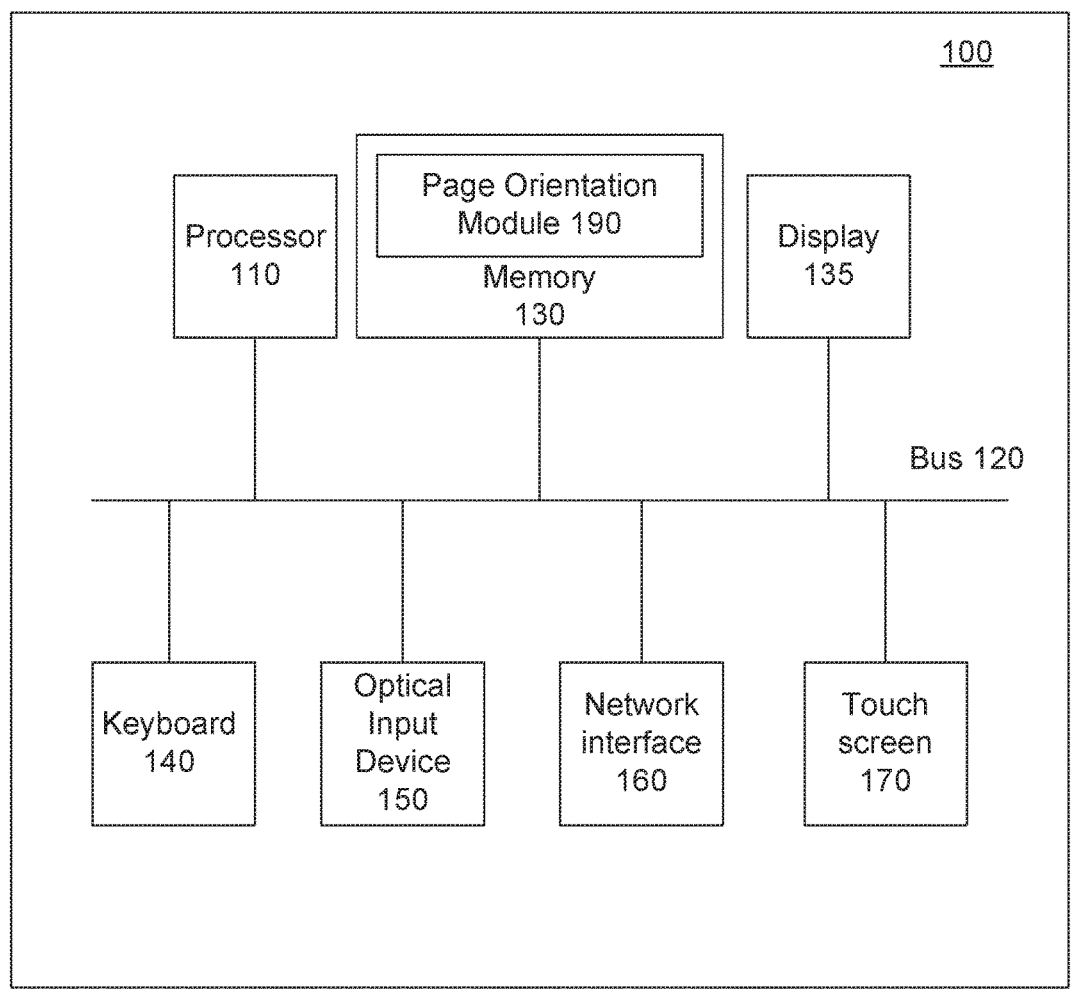
FIG. 1 depicts a high-level component diagram of an example computing device architecture, in accordance with one or more aspects of the present disclosure.

FIG. 1 depicts a high-level component diagram of an example computing device architecture in accordance with one or more aspects of the present disclosure. In illustrative examples, computing device 100 may be provided by various computing devices including a tablet computer, a smart phone, a notebook computer, a camera, a video camera, or the like. In one embodiment, computing device 100 may be a mobile device that captures an image (e.g., via a camera of the mobile device) and performs the page orientation processing on the image locally on the mobile device as described below. In another embodiment, the mobile device may capture the image and transmit it to a server that performs the page orientation processing as described below. The server may then return the image and the orientation information to the mobile device so that the mobile device can perform additional processing (e.g., OCR, horizontal distortion correction, or the like).

Computing device 100 may comprise a processor 110 coupled to a system bus 120. Other devices coupled to system bus 120 may include memory 130, display 135 equipped with a touch screen input device 170, keyboard 140, network interface 160, and optical input device 150. The term "coupled" herein shall include both electrically connected and communicatively coupled via one or more interface devices, adapters, or the like.

Processor 110 may be provided by one or more processing devices including general purpose and/or specialized processors. Memory 130 may comprise one or more volatile memory devices (for example, RAM chips), one or more non-volatile memory devices (for example, ROM or EEPROM chips), and/or one or more storage memory devices (for example, optical or magnetic disks). Optical input device 150 may be and/or include one or more cameras, scanners, barcode readers, and/or any other device that is capable of generating images of a document.

Computing device 100 may comprise a touch screen input device 170 represented by a touch-sensitive input area and/or presence-sensitive surface overlaid over display 135. An example of a computing device implementing aspects of the present disclosure will be discussed in more detail below with reference to FIG. 12.

Memory 130 may store instructions of a page orientation module 190 for determining the direction of rows of text in an image of a document. In some implementations, page orientation module 190 may be implemented as a function to be invoked via a user interface of another application (e.g., a document scanning application, a camera application, or the like). Alternatively, page orientation module 190 may be implemented as a stand-alone application. In an illustrative example, page orientation module 190 may first receive an image of a document. A document may include one or more pages of an open book, a printed sheet of paper containing text (e.g., a travel brochure, map, legal document, printed report, etc.), a text document affixed to a structure (e.g., a posted document on a wall or billboard), or the like.

In some implementations, the image of the document may be received by presenting a user interface that assists a user with capturing the image of the document. The user interface may be provided by page orientation module 190 that executes on a mobile device. Page orientation module 190 may be a mobile application (or part of a mobile application) installed on a mobile device that includes a camera capable of capturing an image. The mobile device can be a mobile phone, personal data assistant (PDA), camera, video camera, laptop computer, etc. For example, a user may launch an application on a camera-equipped mobile phone, and a user interface may subsequently be presented that assists the user with taking a photograph of the document. Alternatively, the application may receive an image of the document by importing the image from a photograph library stored on the mobile device, by downloading the image from an external source, by capturing a frame from a video stream, or in any other manner. Alternatively, page orientation module 190 may be executed by a server machine that can receive an image of the document from the mobile device via a network.

In some implementations, page orientation module 190 may transform the image to a normalized image by reducing the size of the image to a predetermined size. Reducing the size of the image can reduce the amount of computation required, thereby improving the performance of the page orientation module 190 on a mobile device. For example, the normalized image may be 800 pixels by 600 pixels. Alternatively, page orientation module 190 may transform the image using different lengths or widths depending on the dimensions of the original document. In some implementations, page orientation module 190 may receive the image of the document that has already been normalized.

Page orientation module 190 may transform the normalized image to a binarized image by performing a binarization operation on the image. A binarization operation can convert a gray-scale or color document image into a binary document image that has two values for each pixel. For example, the binarized image may store the value of each pixel as either black or white. In some implementations, page orientation module 190 may perform the binarization operation using adaptive binarization. Adaptive binarization measures the brightness of the image background and the saturation of the black areas within the image to determine optimal binarization parameters for separate areas of the document. Thus, adaptive binarization can produce a more accurate binary image when the original document image includes background images, textures, or image noise.

Page orientation module 190 may identify a portion of the binarized image that includes one or more rows of textual content. Textual content can include strings of alphabetic characters, alphanumeric characters, symbolic characters (e.g., Asian language characters), Cyrillic script characters, or the like. Rows of textual content can include lines of text as could be found in sentences or paragraphs of printed documents. Page orientation module 190 can identify an area of the image of the document that is more likely to contain a concentrated area of text by excluding an area along the perimeter of the image. In many cases, the perimeter edges of the image of the document are more likely to include significant whitespace (e.g., page margins) or image noise (e.g., image distortions present at the outermost edges of an image).

Page orientation module 190 may identify the perimeter area along the perimeter of the binarized image that meets a predefined threshold width value. In some implementations, the predefined threshold width value may be a fixed size (e.g., a width of 100 pixels along each edge of the image). In some implementations, the threshold may be a percentage of the size of the image. For example, the perimeter threshold may be set to 15% of the width of the image of the document. Thus, for a binarized image that is 600 pixels wide, page orientation module 190 may identify a perimeter area around the image that is less than or equal to 90 pixels wide. Page orientation module 190 may then select the portion of the binarized image that excludes this perimeter area.

In some implementations, the perimeter area may be identified using a classifier component. A classifier is a machine learning technique that can map input data to a category using pattern recognition. A classifier can identify to which of a set of categories a new observed data value belongs by using a training set of previously observed data values where the associated categories for each observed data value are known. Thus, the classifier can analyze characteristics of the image of the document to determine the size of the perimeter area based on similar characteristics of previously analyzed document images.

In an illustrative example, page orientation module 190 can train a classifier component by associating a set of predetermined perimeter values with corresponding image characteristics. Image characteristics can include the dimensions of the document in the image (e.g., standard letter, legal, etc.), source (e.g., book, textbook, periodical, etc.), content classification (e.g., text only, text and images, columns, etc.), or other similar information. In some implementations, the classifier may be trained such that the perimeter area may be larger for a legal size document (which may contain more whitespace at the perimeter due to wider margins) than that for a standard letter size document. Page orientation module 190 may then identify the image characteristics associated with the binarized image, and subsequently determine the perimeter area of the binarized image by applying the classifier to the image characteristics associated with the binarized image. For example, if the binarized image has image dimensions that are similar in length and width to previously analyzed document images of legal documents with larger perimeter areas, page orientation module 190 may determine that a larger perimeter area should be excluded from the binarized image. The previously analyzed results used to train the classifier may cause the classifier to determine that excluding a larger perimeter area should lead to a more accurate identification of the area of the binarized image that is most likely to contain text content.

Page orientation module 190 may then identify a plurality of horizontal runs of white pixels in the one or more rows of textual content in the portion of the binarized image, and a plurality of vertical runs of white pixels in the one or more rows of textual content in the portion of the binarized image. A "run" of pixels may be a sequence in which the same data value occurs in many consecutive pixels. For example, a horizontal line of pixels in the binarized image that includes 20 white pixels, followed by 10 black pixels, followed by 3 white pixels, followed by 10 black pixels and followed by 5 white pixels, can be described as having five "runs"—3 runs of white pixels (of lengths 20, 3, and 5) and two runs of black pixels (of lengths 10 each). In some implementations, page orientation module 190 may identify the runs of white pixels by applying a run-length encoding (RLE) data compression algorithm to the portion of the binarized image. Run-length encoding is a form of lossless data compression that determines the runs and stores them as a single data value with an associated count. Using the above example, RLE may store the horizontal line of pixels noted above as "20W10B3W10B5 W".

Page orientation module 190 may identify the runs of white pixels rather than black pixels because in many cases runs of white pixels have different lengths in horizontal and vertical directions within the image of a document, which can be informative with respect to the orientation of rows of text. For example, a row of text may have longer vertical runs of white pixels than horizontal runs. With many fonts, black pixels are equally distributed in the horizontal and vertical directions, and thus may not be informative with respect to text orientation. However, in embodiments where the image includes variable sized fonts, where the horizontal and vertical runs of black pixels are most likely to be different, page orientation module 190 may identify the runs of black pixels as well.

Page orientation module 190 may then use the runs of white pixels to construct a first histogram for the plurality of horizontal runs of white pixels in the portion of the binarized image, and a second histogram for the plurality of vertical runs of white pixels in the portion of the binarized image. The histograms may plot the number of runs (on the y-axis) against the run length (on the x-axis). In some implementations, the first histogram may include a first plurality of interval bins that each correspond to a length of one or more of the plurality of horizontal runs of white pixels in the portion of the binarized image. Thus, each interval bin on the x-axis of the histogram can be associated with a horizontal run length for the horizontal runs of white pixels. The second histogram may include a second plurality of interval bins that each correspond to a length of one or more of the plurality of vertical runs of white pixels in the portion of the binarized image. Thus, each interval bin on the x-axis of the second histogram can be associated with a vertical run length for the vertical runs of white pixels. Illustrative examples of histograms for horizontal and vertical runs of white pixels are described below with respect to FIGS. 2A-2B.

Page orientation module 190 may then determine an orientation of the one or more rows of textual content in the portion of the binarized image based on the first histogram and the second histogram. In one embodiment, page orientation module 190 may determine the orientation by comparing the areas of the two histograms for runs of white pixels that are within a maximum threshold length. By using a maximum threshold length, page orientation module 190 can direct analysis to shorter runs of white pixels, which can be more informative of the orientation of rows of text. In some implementations, longer runs of white pixels can represent the white space that is present in between lines of text (in the horizontal direction) as well as white space between columns of text (in the vertical direction). Thus, page orientation module 190 can use the maximum threshold length to reduce the impact that a longer run of white pixels may have on the determination of text row orientation.

Similarly, page orientation module 190 may further refine the areas of the two histograms by setting a minimum threshold length for use in the area analysis. Using a minimum threshold can reduce the impact that noise or distortion in the image may have on the determination of text row orientation. Thus, the analysis can be directed to short runs of white pixels that are greater than the minimum threshold but less than the maximum threshold. In some implementations, the minimum threshold can be set using the attributes of the binarized image. For example, the minimum threshold may be set to a pixel value that is slightly smaller than the distance between characters in the binarized image, which can reduce the likelihood that digital noise in the image may impact the page orientation determination.

In various implementations, the maximum threshold length and the minimum threshold length may be set to fixed values. Alternatively, page orientation module 190 may set the threshold values empirically by accessing historical information for previous document scans to determine an optimal minimum threshold length and an optimal maximum threshold length based on attributes associated with the binarized image (e.g., character spacing, document layout, image dimensions, etc.). In other implementations, page orientation module 190 may use a classifier as described above to set the threshold values. Page orientation module 190 may determine the threshold values at the same time the perimeter values are calculated, or alternatively, may train and apply a second classifier that is directed specifically to determining one or both of the threshold values.

Page orientation module 190 may select a first set of interval bins from the first plurality of interval bins of the first histogram, where the first set of interval bins comprises horizontal runs of white pixels that are less than or equal to the maximum threshold length. Alternatively, page orientation module 190 may select the first set of interval bins that comprises horizontal runs of white pixels that are greater than the minimum threshold length and less than or equal to the maximum threshold length. For example, page orientation module 190 may set a minimum threshold of 2 pixels and a maximum threshold of 4 pixels. Thus, page orientation module 190 may select the interval bins from the first histogram that correspond to the run lengths of 2, 3, and 4 pixels as the set of interval bins to use for the area calculation. Alternatively, page orientation module 190 may not set a minimum threshold and select the interval bins from the first histogram that correspond to the run lengths of 1, 2, 3, and 4 pixels.

Page orientation module 190 may then calculate the area of the selected set of interval bins from the first histogram. In some implementations, page orientation module 190 may calculate the area using equation (1) below:

$$S1 = \sum_{L=1}^{th_L} L * N_L,$$ (1)

In equation (1), S1 is the total area for the selected set of interval bins from the histogram, L is the length of the run of white pixels, and $N_L$ is the number of the run of white pixel with length L. The total area for the selected set of interval bins (S1) is calculated by summing the area of each interval bin from the first interval bin to the interval bin for the maximum threshold length $th_L$ of runs of white pixels. At each interval bin, the area for that bin is calculated as the run length of the bin multiplied by the number of runs identified for that length. For example, if no minimum threshold is set, and the first set of interval bins includes the bins that correspond to run lengths L of 1, 2, 3, and 4 pixels, the area S1 could be calculated as the sum of the areas for each of the four bins. If there were 10 runs of 1 pixel, 20 runs of 2 pixels, 30 runs of 3 pixels, and 40 runs of 4 pixels, area S1 could be calculated as (10×1)+(20×2)+(30×3)+(40×4).

Page orientation module 190 may then repeat the above process for the second histogram for the plurality of vertical runs of white pixels. Page orientation module 190 may select a second set of interval bins from the second plurality of interval bins of the second histogram, where the second set of interval bins comprises vertical runs of white pixels that are less than or equal to the maximum threshold length. Alternatively, page orientation module 190 may select the second set of interval bins that comprises vertical runs of white pixels that are greater than the minimum threshold length and less than or equal to the maximum threshold length. For example, page orientation module 190 may set a minimum threshold of 2 pixels and a maximum threshold of 4 pixels. Thus, page orientation module 190 may select the interval bins from the second histogram that correspond to the run lengths of 2, 3, and 4 pixels as the set of interval bins to use for the area calculation. Alternatively, page orientation module 190 may not set a minimum threshold and select the interval bins from the first histogram that correspond to the run lengths of 1, 2, 3, and 4 pixels.

Page orientation module 190 may then calculate the area value of the selected set of interval bins from the second histogram. In some implementations, page orientation module 190 may calculate the area using equation (2) below:

$$S2 = \sum_{L=1}^{th_L} L * N_L,$$ (2)

In equation (2), S2 is the total area for the selected set of interval bins from the histogram, L is the length of the run of white pixels, and $N_L$ is the number of the run of white pixel with length L. The total area for the selected set of interval bins (S2) is calculated by summing the area of each interval bin from the first interval bin to the interval bin for the maximum threshold length $th_L$. At each interval bin, the area for that bin is calculated as the run length of the bin (L) multiplied by the number of runs identified for that length ($N_L$). For example, if no minimum threshold is set, and the second set of interval bins includes the bins that correspond to run lengths of 1, 2, 3, and 4 pixels, the area S2 could be calculated as the sum of the areas for each of the four bins. If there were 5 runs of 1 pixel, 10 runs of 2 pixels, 15 runs of 3 pixels, and 20 runs of 4 pixels, area S2 could be calculated as (5×1)+(10×2)+(15×3)+(20×4).

Page orientation module 190 may then compare the first area (S1) for first selected set of bins in the first histogram to the second area (S2) for the second selected set of bins in the second histogram. Page orientation module 190 may determine the orientation of the rows of textual content using equation (3) below:

$$\frac{\max\{S1, S2\}}{\min\{S1, S2\}} > k$$ (3)

In equation (3), the maximum of the first area (S1) and the second area (S2) is divided by the minimum of the first area (S1) and the second area (S2) to obtain a ratio of the maximum to the minimum. If that ratio is greater than a value k, which represents a confidence threshold value, then page orientation module 190 may make a determination of the orientation of the rows of textual content. The confidence threshold value may be set to indicate that the maximum area should be at least k times greater than the minimum area value to make a determination of the text orientation. The confidence threshold value may be set to a specific value (e.g., 2), may be set empirically using historical confidence values for previous document scans (e.g., an average of previous values, the mean of previous values, or the like), may be set using a classifier as described above (e.g., using the same classifier for the perimeter, or a different classifier), or in any other manner. If the ratio is not greater than the confidence threshold, then page orientation module 190 may determine that there is not enough information to make an orientation determination, and may subsequently recalculate the areas of the histograms by increasing the maximum threshold lengths for both S1 and S2 as described below.

Responsive to determining that the first area (S1) is greater than the second area (S2), page orientation module 190 may set the maximum area to the first area (S1) and set the minimum area to the second area (S2). Conversely, responsive to determining that the second area (S2) is greater than the first area (S1), page orientation module 190 may set the maximum area to the second area (S2) and set the minimum area to the first area (S1). Page orientation module 190 may then calculate the area ratio by dividing the maximum area by the minimum area. Responsive to determining that the ratio exceeds the confidence threshold (k), page orientation module 190 may determine the orientation of the rows of textual content in the image based on which of the areas are selected as the maximum value.

For example, responsive to determining that the first area value (S1) is the maximum value (e.g., S1 is greater than S2), page orientation module 190 may determine that the orientation of the rows of textual content is horizontal (e.g., since the first area value (S1) corresponds to the histogram for the horizontal runs of white pixels). Similarly, responsive to determining that the second area value (S2) is the maximum value (e.g., S2 is greater than S1), page orientation module 190 may determine that the orientation of the rows of textual content is vertical (e.g., since the second area value (S2) corresponds to the histogram for the vertical runs of white pixels).

Responsive to determining that the ratio is less than the confidence threshold (k), page orientation module 190 may recalculate values for S1 and S2 with an increased maximum threshold length. For example, if the initial maximum threshold length was set to 4 pixels, page orientation module may increase the threshold length to 5 pixels. Page orientation module 190 may then recalculate the first area for the horizontal runs using the increased threshold length (e.g., to calculate an updated S1, or S1') and recalculate the second area for the vertical runs using the increased threshold length (e.g., to calculate an updated S2, or S2'). In some implementations, page orientation module 190 may recalculate the areas using the equations (1) and (2) described above where maximum threshold length $th_L$ is set to the increased maximum threshold length. Page orientation module 190 may then compare the recalculated first area (S1') to the recalculated second area (S2') to determine a new maximum area and a new minimum area based on the recalculated first area (S1') and the recalculated second area (S2'). Page orientation module 190 may then recalculate the area ratio based on the new maximum area and the new minimum area, and responsive to determining that the recalculated area ratio exceeds the confidence threshold (k), determine the orientation of the rows of textual content in the image based on the new maximum area as described above. If the recalculated area ratio still does not exceed the confidence threshold (k), page orientation module 190 may further increase the maximum threshold length, and then recalculate values for S1 and S2 with the newly increased maximum threshold length as discussed above. This process can be repeated until the recalculated area ratio exceeds the confidence threshold (k).

In another embodiment, page orientation module 190 may determine the orientation of the one or more rows of textual content in the portion of the binarized image by analyzing dependency ratios of the areas of the first histogram to the areas of the second histogram. A dependency ratio is a ratio of the area for a particular run length of the first histogram to the area for that same run length of the second histogram. For example, for a run length of 1, the dependency ratio may be the area of the first histogram for the interval bin associated with the run length of 1 (e.g., using the area equation (1) described above with a threshold of 1), divided by the area of the second histogram for the interval bin associated with the run length of 1 (e.g., using the area equation (2) described above with a threshold of 1). For a run length of 2, the dependency ratio may be the total area for interval bins for lengths 1 and 2 (e.g., using the area equations above with a threshold of 2), divided by the area of the second histogram for the interval bins for run length of 1 and 2 (e.g., using the area equation (2) described above with a threshold of 2).

In an illustrative example, page orientation module 190 may select a first set of interval bins from the first plurality of interval bins of the first histogram, where the first set of interval bins comprises horizontal runs of white pixels that are less than or equal to a first length. For example, the first length may be set to be the lowest number of pixels represented in the histogram (e.g., 1 pixel). Alternatively, the first length may be set to a minimum threshold length as described above. Page orientation module 190 may then calculate the area of the first set of interval bins from the first histogram (e.g., using equation (1) above). Page orientation module 190 may then select a second set of interval bins from the second plurality of interval bins of the second histogram that represent the vertical runs of white pixels that are less than or equal to the first length. Page orientation module 190 may then calculate the area of the second set of interval bins from the second histogram (e.g., using equation (2) above). Thus, the areas for both histograms may be calculated for the same first length. Page orientation module 190 may then calculate a first dependency ratio for the first length by dividing the area of the first histogram at the first length by the area of the second histogram at the first length.

Page orientation module 190 may then calculate additional dependency ratios for additional run lengths for the two histograms. In some implementations, page orientation module 190 may calculate additional dependency ratios for each interval bin of the two histograms. For example, if the two histograms are generated with 10 interval bins (e.g., a bin for each of 10 run lengths), then 10 dependency ratios may be calculated. Alternatively, page orientation module 190 may generate dependency ratios for a subset of the interval bins. For example, a dependency ratio may be generated for those interval bins between the minimum threshold length and the maximum threshold length. For each interval bin, page orientation module 190 may calculate the corresponding area values for each histogram using the summation equations (1) and (2) described above, and then calculate the corresponding dependency ratio for that interval bin accordingly.

Page orientation module 190 may then analyze the dependency ratios for each run length of the two histograms to determine the orientation of the rows of textual content. In some implementations, page orientation module 190 may generate a distribution graph of the dependency ratios as described below with respect to FIGS. 3A-3B. The distribution graph may plot the dependency ratio values for each run length, where the run lengths are plotted along the x-axis in ascending order. Page orientation module 190 may then determine the global maximum and the global minimum among the dependency ratios to determine the text orientation. The global maximum may be the dependency ratio that is the largest among the dependency ratios calculated. The global minimum may be the dependency ratio that is the smallest among the dependency ratios calculated. In some implementations, page orientation module 190 may determine the global maximum and the global minimum by applying threshold filters. For example, page orientation module 190 may select a subset of the dependency ratios that are above a minimum threshold value and below a maximum threshold value in order to reduce the impact of noise, distortion, or other anomalies that may result in the presence of very short runs of white pixels or very long runs of white pixels.

Responsive to determining that the global maximum of the dependency ratios is associated with a run length that is shorter than the run length associated with the global minimum of the dependency ratios, page orientation module 190 may determine that the orientation of the rows of textual content in the image is horizontal. For example, using the distribution graph described above, if the global maximum occurs to the left of the global minimum, the orientation of the textual content is horizontal. An illustrative example of this graph is described below with respect to FIG. 3B.

Responsive to determining that the global minimum of the dependency ratios is associated with a run length that is shorter than the run length associated with the global maximum of the dependency ratios, page orientation module 190 may determine that the orientation of the rows of textual content in the image is vertical. For example, using the distribution graph described above, if the global minimum occurs to the left of the global maximum, the orientation of the textual content is vertical. An illustrative example of this graph is described below with respect to FIG. 3A.

In another embodiment, page orientation module 190 may determine the orientation of the one or more rows of textual content in the portion of the binarized image by using a classifier component. In an illustrative example, page orientation module 190 may receive a plurality of histogram pairs, where each histogram pair includes a histogram for horizontal runs of white pixels and a histogram for vertical runs of white pixels, and where each histogram pair is associated with a document orientation. In some implementations, the document orientation associated with each of the plurality of histogram pairs may have been determined using the process described above for previously analyzed documents. Alternatively, the document orientation for each histogram pair may have been determined by a separate process and stored for use by page orientation module 190 to train the classifier.

Page orientation module 190 can train the classifier component by associating one or more data elements from the plurality of histogram pairs with a corresponding document orientation. The data elements may include at least one of an interval bin value, a dependency ratio, an area ratio, or a difference between a maximum area value and a minimum area value of the histogram pairs. Each of the data elements may be associated with one of the histograms of a pair of histograms, or alternatively, may be associated with a pair of histograms. Page orientation module 190 may then extract the one or more data elements from the first histogram and the second histogram that were generated for the runs of white pixels in the binarized image as described above. Page orientation module 190 may then determine the orientation of the rows of textual content in the image by applying the classifier to the data elements extracted from the first histogram and the second histogram.

While three embodiments for determining the orientation of the rows of textual content have been described separately above, in some implementations, page orientation module 190 may determine the orientation of the textual content using a combination of elements of the described embodiments.

Figure 2A:
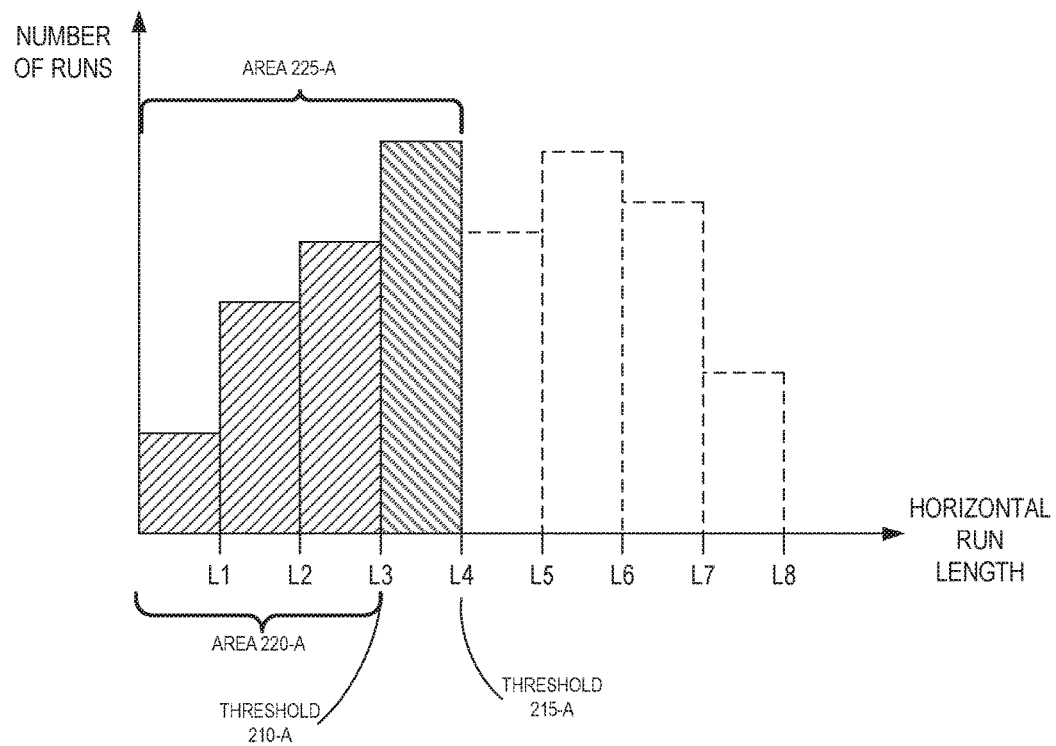
FIG. 2A illustrates an example of a histogram for horizontal runs of white pixels in an image of a document, in accordance with one or more aspects of the present disclosure.
Figure 2B:
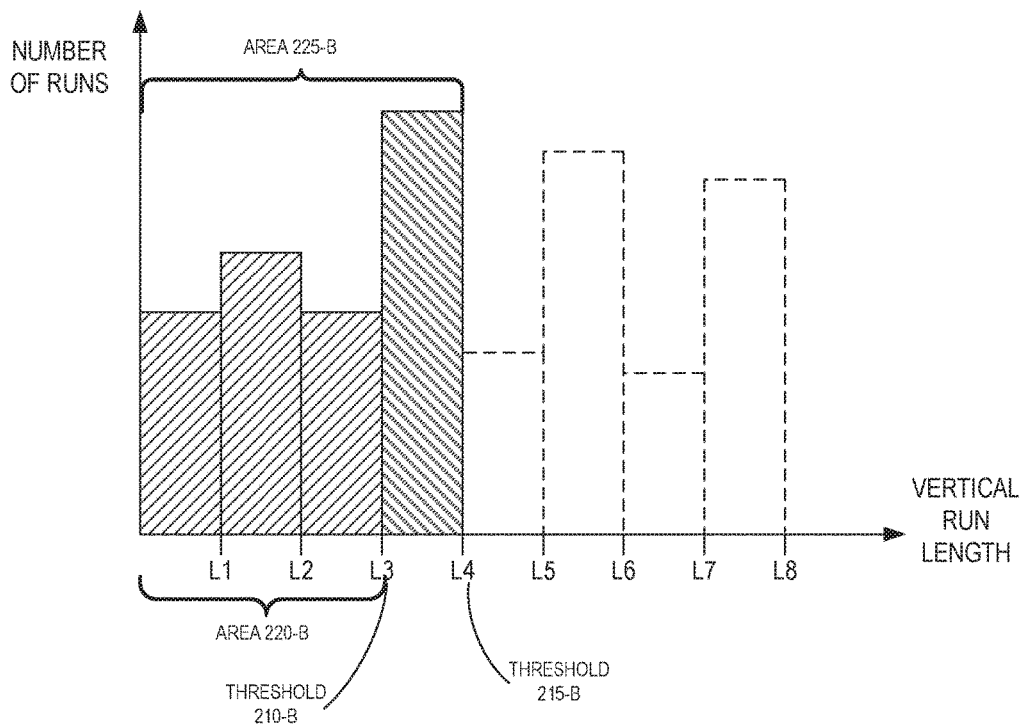
FIG. 2B illustrates an example of a histogram for vertical runs of white pixels in an image of a document, in accordance with one or more aspects of the present disclosure.

FIGS. 2A-2B illustrate examples of histograms for runs of white pixels in an image of a document, in accordance with one or more aspects of the present disclosure. In one embodiment, FIGS. 2A-2B illustrate histograms generated by the operations performed to determine the orientation of textual content in an image, as described above and below with respect to FIGS. 4-11.

FIG. 2A illustrates an example of a histogram for horizontal runs of white pixels in an image of a document. The histogram of FIG. 2A plots the number of horizontal runs (on the y-axis) against the horizontal run length (on the x-axis). As shown in FIG. 2A, there are eight interval bins for the horizontal run histogram in ascending order, each interval bin representing a run length in pixels. Thus, L1 represents a run length of 1 pixel, L2 a run length of 2 pixels, L3 a run length of 4 pixels, and so on. In an illustrative example of the operations described herein, a threshold 210-A (at the interval bin for run length L3) may be set as the maximum threshold for determining the area 220-A (e.g., the first area S1 described above in FIG. 1) for the histogram of FIG. 2A.

FIG. 2B illustrates an example of a histogram for vertical runs of white pixels in an image of a document. The histogram of FIG. 2B plots the number of vertical runs (on the y-axis) against the vertical run length (on the x-axis). As shown in FIG. 2B, there are eight interval bins for the vertical run histogram in ascending order, each interval bin representing a run length in pixels. Thus, L1 represents a run length of 1 pixel, L2 a run length of 2 pixels, L3 a run length of 4 pixels, and so on. In an illustrative example of the operations described herein, a threshold 210-B (at the interval bin for run length L3) may be set as the maximum threshold for determining the area 220-B (e.g., the second area S2 described above in FIG. 1) for the histogram of FIG. 2B.

As described above with respect to equation (3) of FIG. 1, the orientation of rows of textual content in an image may be determined by comparing area 220-A of FIG. 2A to area 220-B of FIG. 2B. The maximum of area 220-A and area 220-B may be divided by the minimum of area 220-A and area 220-B to determine an area ratio. If the area ratio is greater than a confidence threshold, then the orientation of the textual content may be determined as described above based on which of areas 220-A or 220-B have been determined to be the maximum. If area 220-A is larger than area 220-B, then the orientation is determined to be horizontal. If area 220-B is larger than area 220-A, then the orientation is determined to be vertical.

If the area ratio is not greater than the confidence threshold, the threshold lengths for both histograms may be increased from L3 (threshold 210-A and threshold 210-B) to L4 (threshold 215-A and threshold 215-B). The areas for the histograms may then be recalculated using the updated threshold values. Thus, the area for the histogram of FIG. 2A may be recalculated as area 225-A (e.g., the recalculated first area S1' described above in FIG. 1), and the area for the histogram of FIG. 2B may be recalculated as area 225-B (e.g., the recalculated second area S2' described above in FIG. 1). The maximum/minimum area ratio may be recalculated using the recalculated areas 225-A and 225-B and compared to the confidence threshold. If the new area ratio is greater than the confidence threshold, the orientation of the text can be determined as described above. If the new area ratio is still less than the confidence threshold, the process may be repeated again by setting the threshold length to L5, and so on.

Figure 3A:
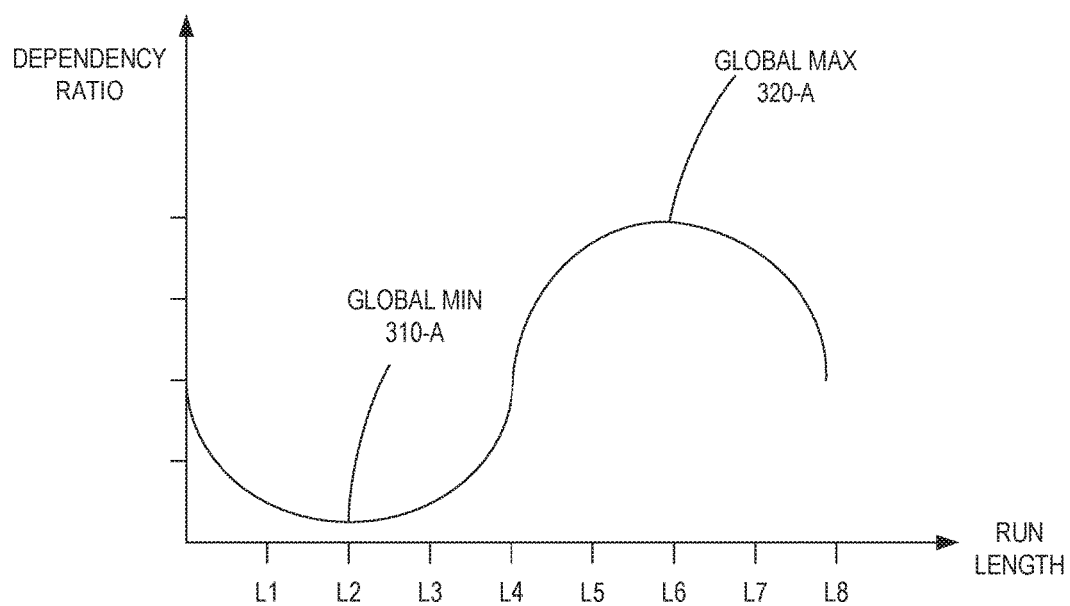
FIG. 3A illustrates an example of a distribution graph of dependency ratios indicating vertical text orientation, in accordance with one or more aspects of the present disclosure.
Figure 3B:
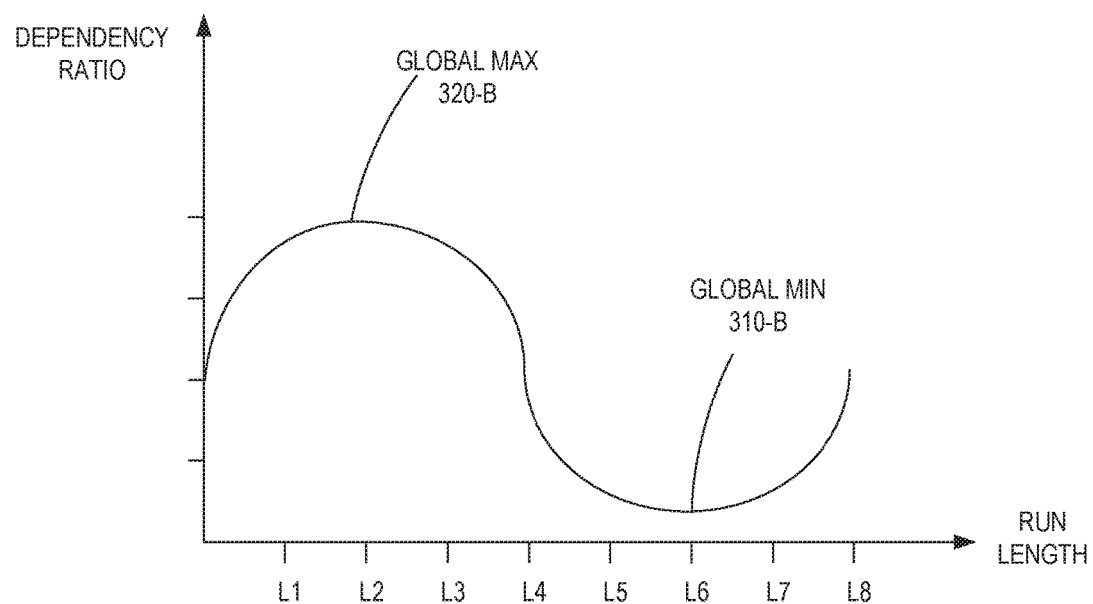
FIG. 3B illustrates an example of a distribution graph of dependency ratios indicating horizontal text orientation, in accordance with one or more aspects of the present disclosure.

FIGS. 3A-3B illustrate examples of distribution graphs of dependency ratios indicating text orientation, in accordance with one or more aspects of the present disclosure. In one embodiment, FIGS. 3A-3B illustrate distribution graphs generated by the operations performed to determine the orientation of textual content in an image, as described above and below with respect to FIGS. 8-9. The distribution graphs of FIGS. 3A-3B may be generated by calculating dependency ratios for each interval bin for a pair of histograms as described above with respect to FIG. 1.

For example, dependency ratios can be generated for each interval bin (L1-L8 from the mentioned above example) for the histograms of FIGS. 2A-2B. The area for L1 of FIG. 2A can be divided by the area for L1 of FIG. 2B to calculate a first dependency ratio, the area for L2 of FIG. 2A can be divided by the area for L2 of FIG. 2B to calculate a second dependency ratio, and so on. Once the dependency ratios are calculated for each interval bin for the pair of histograms, the values may be plotted in a distribution graph. The global maximum value and the global minimum value for the set of dependency ratios can be determined and analyzed within the graph to determine the orientation of the textual content.

FIG. 3A illustrates an example of a distribution graph of dependency ratios indicating vertical text orientation. As shown in FIG. 3A, the distribution of the dependency ratios for the pair of histograms is such that the global min 310-A occurs at a lower run length (L2) than does the global max 320-A (L6). In other words, at shorter run lengths, the number of vertical runs outnumbers the number of horizontal runs (leading to a lower dependency ratio at that run length). This can indicate that there is a higher concentration of short runs of vertical white pixels than of short runs of horizontal white pixels, which in turn, can indicate that the orientation of the textual content is vertical.

FIG. 3B illustrates an example of a distribution graph of dependency ratios indicating horizontal text orientation. As shown in FIG. 3B, the distribution of the dependency ratios for the pair of histograms is such that the global max 320-B occurs at a lower run length (L2) than does the global min 320-A (L6). In other words, at shorter run lengths, the number of horizontal runs outnumbers the number of vertical runs (leading to a higher dependency ratio at that run length). This can indicate that there is a higher concentration of short runs of horizontal white pixels than of short runs of vertical white pixels, which in turn, can indicate that the orientation of the textual content is horizontal.

Figure 4:
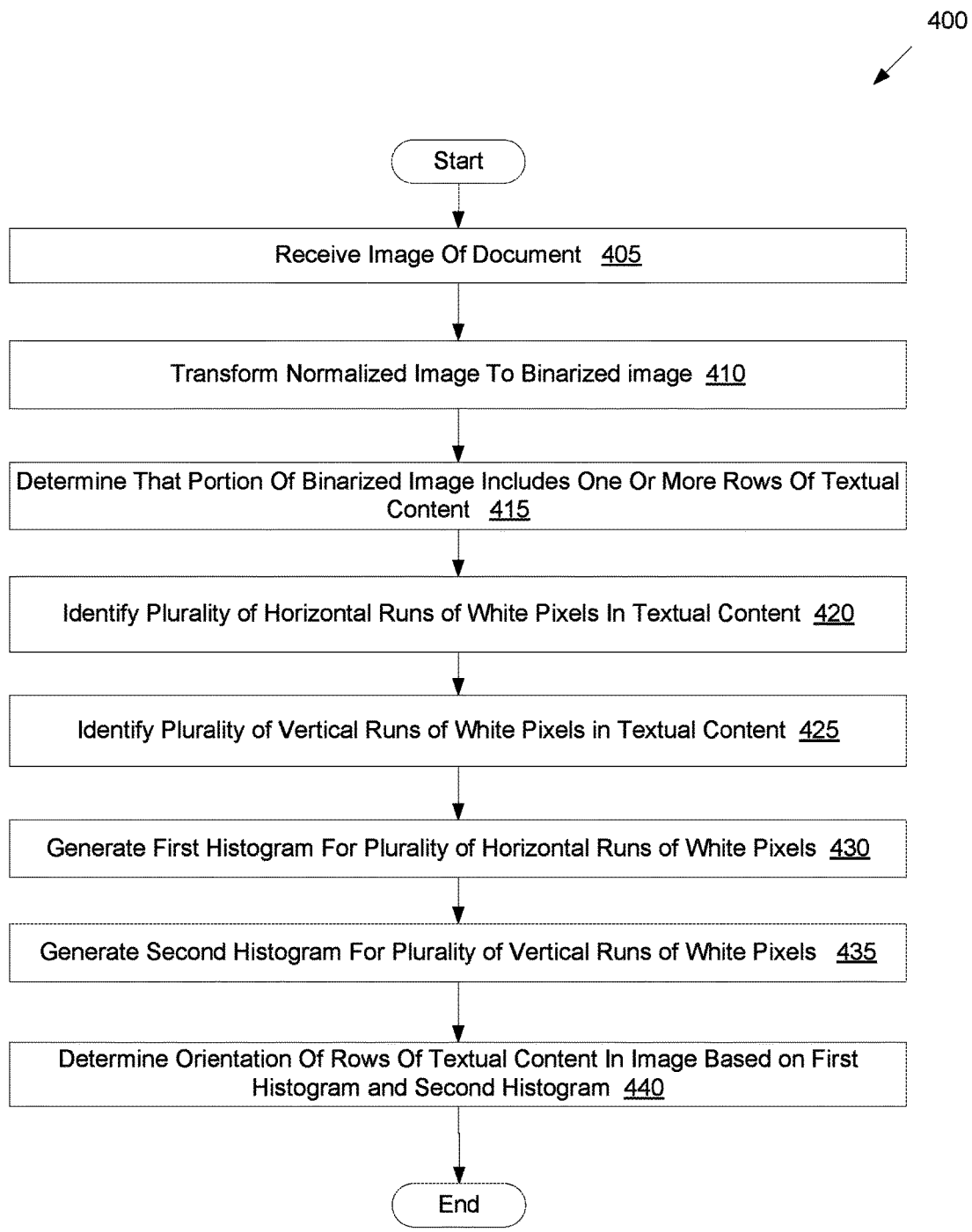
FIG. 4 depicts a flow diagram of a method for determining orientation of rows of textual content in an image, in accordance with one or more aspects of the present disclosure.

FIG. 4 depicts a flow diagram of an example method 400 for determining orientation of rows of textual content in an image. The method may be performed by processing logic that may comprise hardware (circuitry, dedicated logic, etc.), software (such as is run on a general purpose computer system or a dedicated machine), or a combination of both. In one illustrative example, method 400 may be performed by page orientation module 190 in FIG. 1. Alternatively, some or all of method 400 might be performed by another module or machine. It should be noted that blocks depicted in FIG. 4 could be performed simultaneously or in a different order than that depicted.

At block 405, processing logic receives an image of a document. At block 410, processing logic transforms the image to a binarized image by performing a binarization operation on the image. At block 415, processing logic identifies a portion of the binarized image that comprises one or more rows of textual content. In some implementations, processing logic may identify the portion of the binarized image by identifying a perimeter area along the perimeter of the binarized image that meets a threshold width value, and selecting the portion of the binarized image that excludes the perimeter area. At block 420, processing logic identifies a plurality of horizontal runs of white pixels in the one or more rows of textual content in the portion of the binarized image.

At block 425, processing logic identifies a plurality of vertical runs of white pixels in the one or more rows of textual content in the portion of the binarized image. At block 430, processing logic generates a first histogram for the plurality of horizontal runs of white pixels. In some implementations, the first histogram includes a first plurality of interval bins that each correspond to a length of one or more of the plurality of horizontal runs of white pixels.

At block 435, processing logic generates a second histogram for the plurality of vertical runs of white pixels. In some implementations, the second histogram includes a second plurality of interval bins that each correspond to a length of one or more of the plurality of vertical runs of white pixels. At block 440, processing logic determines an orientation of the one or more rows of textual content in the image based on the first histogram and the second histogram. In an illustrative example, processing logic may determine the orientation of the rows of textual content in the image as described below with respect to FIGS. 5-11. After block 440, the method of FIG. 4 terminates.

Figure 5:
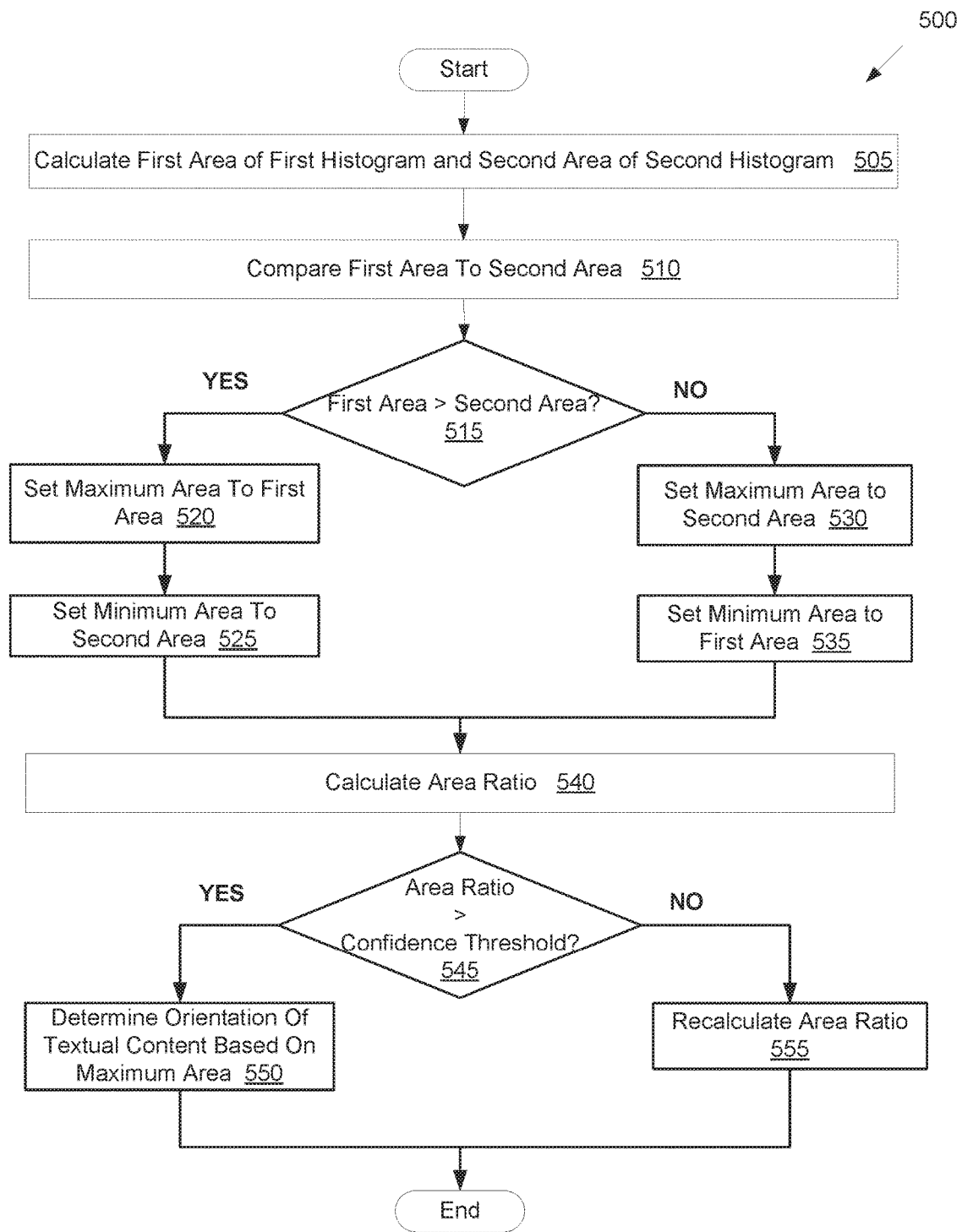
FIG. 5 depicts a flow diagram of a method for determining orientation of rows of textual content by comparing areas of histograms, in accordance with one or more aspects of the present disclosure.

FIG. 5 depicts a flow diagram of an example method 500 for determining orientation of rows of textual content by comparing areas of histograms. The method may be performed by processing logic that may comprise hardware (circuitry, dedicated logic, etc.), software (such as is run on a general purpose computer system or a dedicated machine), or a combination of both. In one illustrative example, method 500 may be performed by page orientation module 190 in FIG. 1. Alternatively, some or all of method 500 might be performed by another module or machine. It should be noted that blocks depicted in FIG. 5 could be performed simultaneously or in a different order than that depicted.

At block 505, processing logic calculates a first area of the first histogram for horizontal runs of white pixels and a second area of the second histogram for vertical runs of white pixels. In an illustrative example, processing logic may calculate the areas as described below with respect to FIG. 6. At block 510, processing logic compares the first area to the second area. At block 515, processing logic determines whether the first area is greater than the second area. If so, processing continues to block 520. Otherwise, processing proceeds to block 530.

At block 520, processing logic sets a maximum area to the first area. At block 525, processing logic sets a minimum area to the second area. After block 525, processing proceeds to block 540. At block 530, processing logic sets the maximum area to the second area. At block 535, processing logic sets the minimum area to the first area. At block 540, processing logic calculates an area ratio by dividing the maximum area by the minimum area. At block 545, processing logic determines whether the area ratio calculated at block 540 is greater than a confidence threshold. If so, processing logic continues to block 550. Otherwise, processing proceeds to block 555.

At block 550, processing logic determines the orientation of the rows of textual content in the image based on the maximum area. In some implementations, responsive to determining that the first area is greater than the second area, processing logic determines that the orientation of the one or more rows of textual content in the image is horizontal. In some implementations, responsive to determining that the second area is greater than the first area, processing logic determines that the orientation of the one or more rows of textual content is vertical. After block 550, the method of FIG. 5 terminates.

At block 555, processing logic recalculates the area ratio by increasing the threshold length. In an illustrative example, processing logic may recalculate the area ratio as described below with respect to FIG. 7. After block 555, the method of FIG. 5 terminates.

Figure 6:
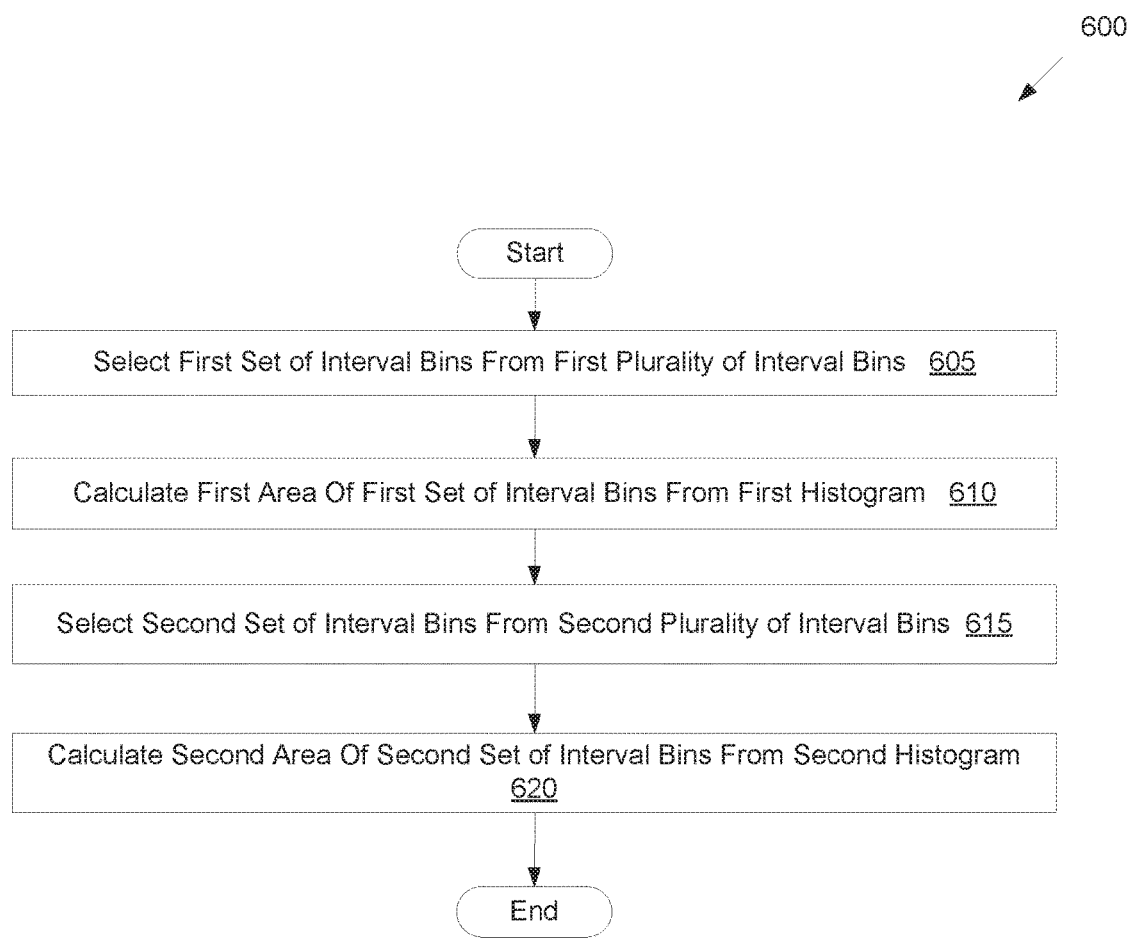
FIG. 6 depicts a flow diagram of a method for calculating areas of histograms, in accordance with one or more aspects of the present disclosure.

FIG. 6 depicts a flow diagram of an example method 600 for calculating areas of histograms. The method may be performed by processing logic that may comprise hardware (circuitry, dedicated logic, etc.), software (such as is run on a general purpose computer system or a dedicated machine), or a combination of both. In one illustrative example, method 600 may be performed by page orientation module 190 in FIG. 1. Alternatively, some or all of method 600 might be performed by another module or machine. It should be noted that blocks depicted in FIG. 6 could be performed simultaneously or in a different order than that depicted.

At block 605, processing logic selects a first set of interval bins from the first plurality of interval bins from the first histogram. In some implementations, the first set of interval bins includes horizontal runs of white pixels that are less than or equal to a threshold length. At block 610, processing logic calculates a first area of the first set of interval bins from the first histogram. In some implementations, processing logic can calculate the first area using the summation equation (1) described above with respect to FIG. 1.

At block 615, processing logic selects a second set of interval bins from the second plurality of interval bins from the second histogram. In some implementations, the second set of interval bins comprise vertical runs of white pixels that are less than or equal to the threshold length. At block 620, processing logic calculates the second area of the second set of interval bins from the second histogram. In some implementations, processing logic can calculate the first area using the summation equation (2) described above with respect to FIG. 1. After block 620, the method of FIG. 6 terminates.

Figure 7:
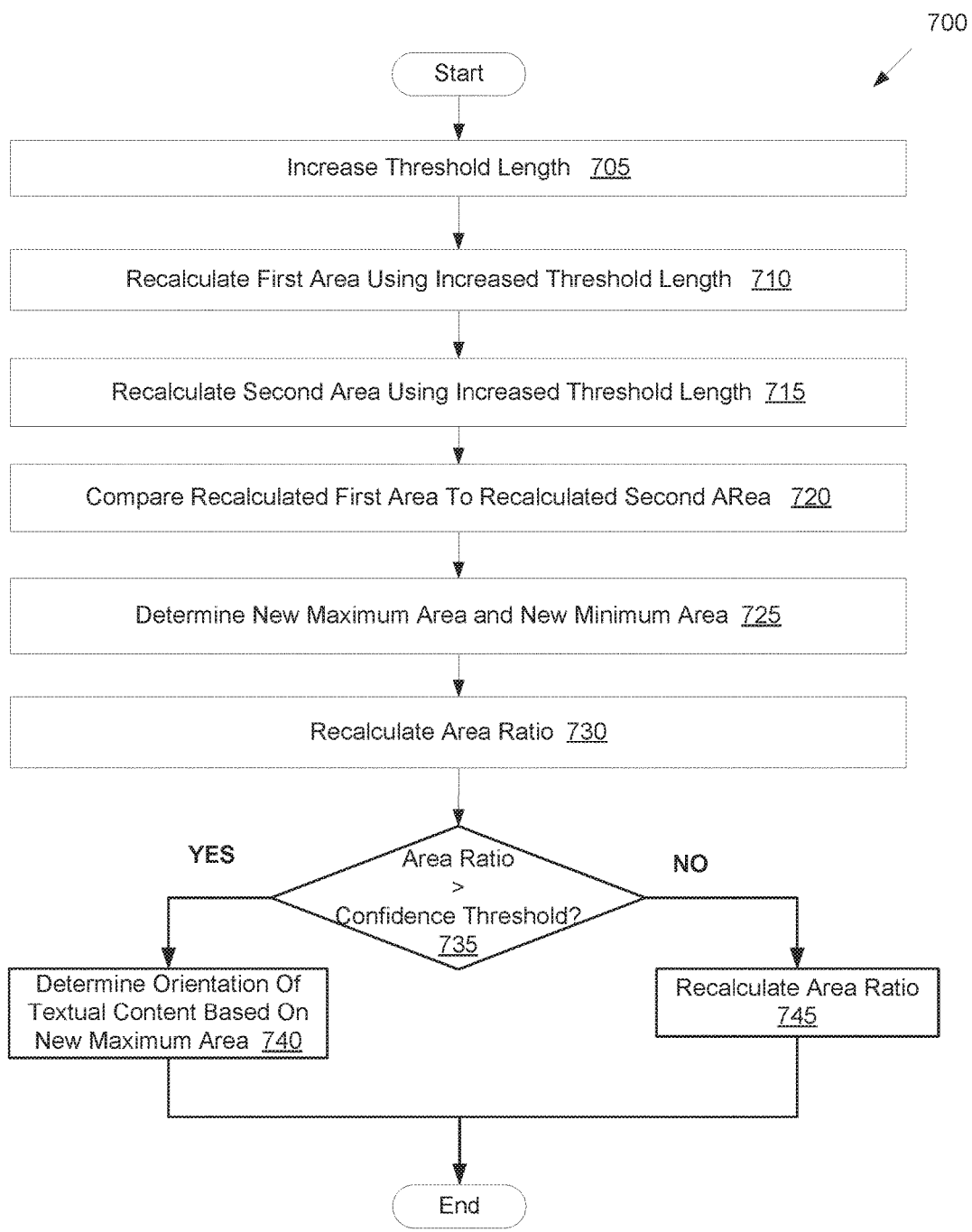
FIG. 7 depicts a flow diagram of a method for recalculating an area ratio, in accordance with one or more aspects of the present disclosure.

FIG. 7 depicts a flow diagram of an example method 700 for recalculating an area ratio. The method may be performed by processing logic that may comprise hardware (circuitry, dedicated logic, etc.), software (such as is run on a general purpose computer system or a dedicated machine), or a combination of both. In one illustrative example, method 700 may be performed by page orientation module 190 in FIG. 1. Alternatively, some or all of method 700 might be performed by another module or machine. It should be noted that blocks depicted in FIG. 7 could be performed simultaneously or in a different order than that depicted.

At block 705, processing logic increases the threshold length used to calculate the previous area ratio. At block 710, processing logic recalculates the first area for the first histogram using the increased threshold length from block 705. At block 715, processing logic recalculates the second area for the second histogram using the increased threshold length from block 705. At block 720, processing logic compares the recalculated first area from block 710 to the recalculated second area from block 715. At block 725, processing logic determines a new maximum area and a new minimum area based on the comparison at block 720. At block 730, processing logic recalculates the area ratio by dividing the new maximum area by the new minimum area.

At block 735, processing logic determines whether the new area ratio is greater than the confidence threshold. If so, processing continues to block 740. Otherwise processing proceeds to block 745. At block 740, processing logic determines the orientation of the rows of textual content based on the new maximum area. In some implementations, responsive to determining that the recalculated first area is greater than the recalculated second area, processing logic determines that the orientation of the one or more rows of textual content is horizontal. In some implementations, responsive to determining that the recalculated second area is greater than the recalculated first area, processing logic determines that the orientation of the one or more rows of textual content is vertical. After block 740, the method of FIG. 7 terminates. At block 745, processing logic recalculates the area ratio by increasing the threshold length and repeating the process. After block 745, the method of FIG. 7 terminates.

Figure 8:
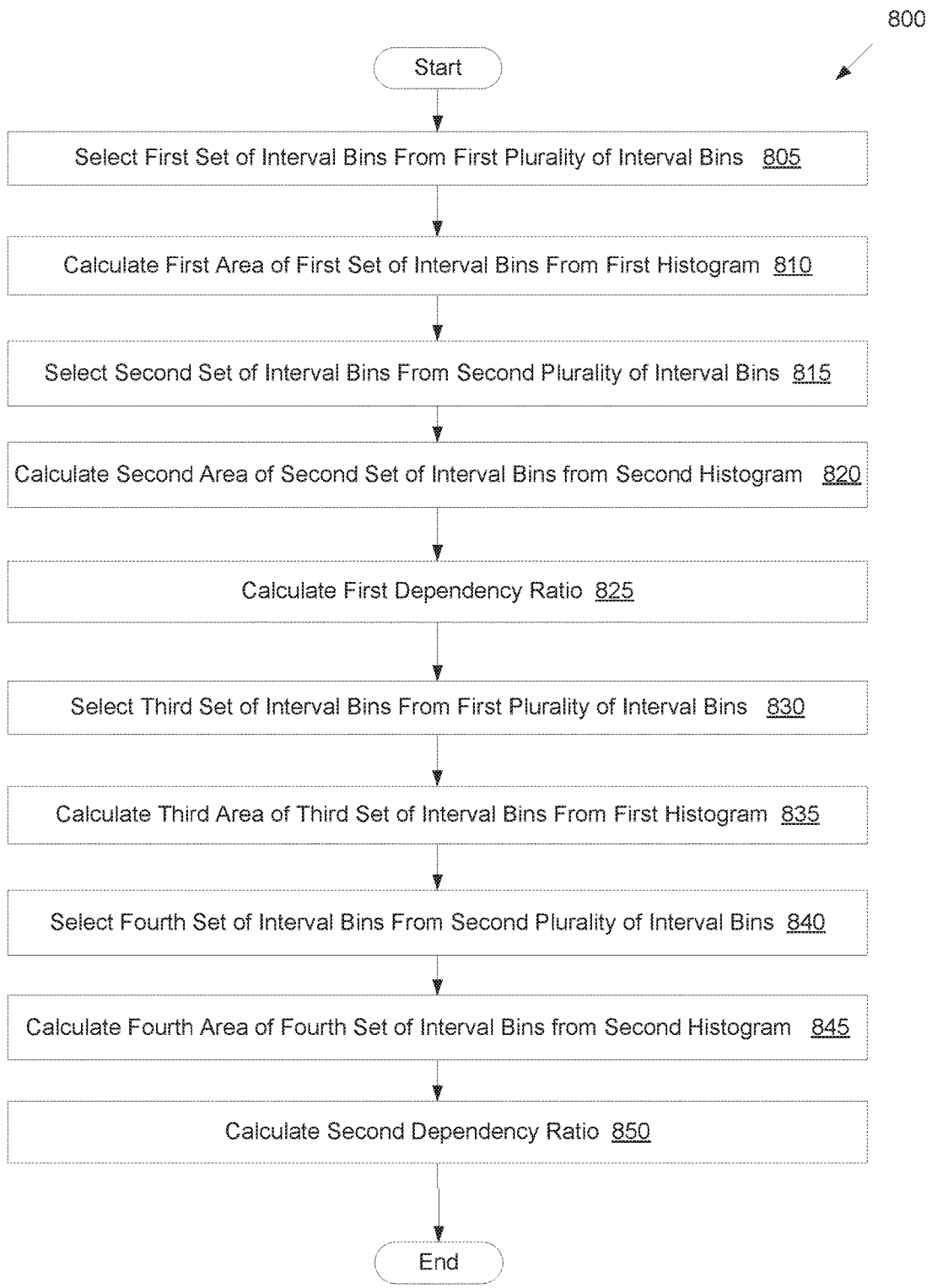
FIG. 8 depicts a flow diagram of a method for calculating dependency ratios, in accordance with one or more aspects of the present disclosure.

FIG. 8 depicts a flow diagram of an example method 800 for calculating dependency ratios. The method may be performed by processing logic that may comprise hardware (circuitry, dedicated logic, etc.), software (such as is run on a general purpose computer system or a dedicated machine), or a combination of both. In one illustrative example, method 800 may be performed by page orientation module 190 in FIG. 1. Alternatively, some or all of method 800 might be performed by another module or machine. It should be noted that blocks depicted in FIG. 8 could be performed simultaneously or in a different order than that depicted.

At block 805, processing logic selects a first set of interval bins from the first plurality of interval bins of the first histogram. In some implementations, the first set of interval bins comprises horizontal runs of white pixels that are less than or equal to a first length. At block 810, processing logic calculates a first area of the first set of interval bins from the first histogram. At block 815, processing logic selects a second set of interval bins from the second plurality of interval bins of the second histogram. In some implementations, the second set of interval bins includes vertical runs of white pixels that are less than or equal to the first length. At block 820, processing logic calculates a second area of the second set of interval bins from the second histogram. At block 825, processing logic calculates a first dependency ratio for the first length by dividing the first area calculated at block 810 by the second area calculated at block 820.

At block 830, processing logic selects a third set of interval bins from the first plurality of interval bins of the first histogram. In some implementations, the third set of interval bins comprises horizontal runs of white pixels that are less than or equal to a second length. At block 835, processing logic calculates a third area of the third set of interval bins from the first histogram. At block 840, processing logic selects a fourth set of interval bins from the second plurality of interval bins of the second histogram. In some implementations, the fourth set of interval bins includes vertical runs of white pixels that are less than or equal to the second length. At block 845, processing logic calculates a fourth area of the fourth set of interval bins from the second histogram. At block 850, processing logic calculates a second dependency ratio for the second length by dividing the third area calculated at block 835 by the fourth area calculated at block 845. After block 850, the method of FIG. 8 terminates.

In some implementations, the above steps of FIG. 8 may be repeated to calculate a dependency ratio for each interval bin pair for the two histograms. Processing logic may then identify a global maximum and global minimum among the calculated dependency ratios. The global maximum may be the dependency ratio that is the largest among the dependency ratios calculated. The global minimum may be the dependency ratio that is the smallest among the dependency ratios calculated. In some implementations, processing logic may verify the global maximum and the global minimum by applying threshold filters. In one embodiment the ratio of global maximum to global minimum may be compared with a confidence threshold value to verify the correctness of detection the extremums (global maximum and global minimum). The ratio of global maximum to global minimum should be greater than the confidence threshold.

Figure 9:
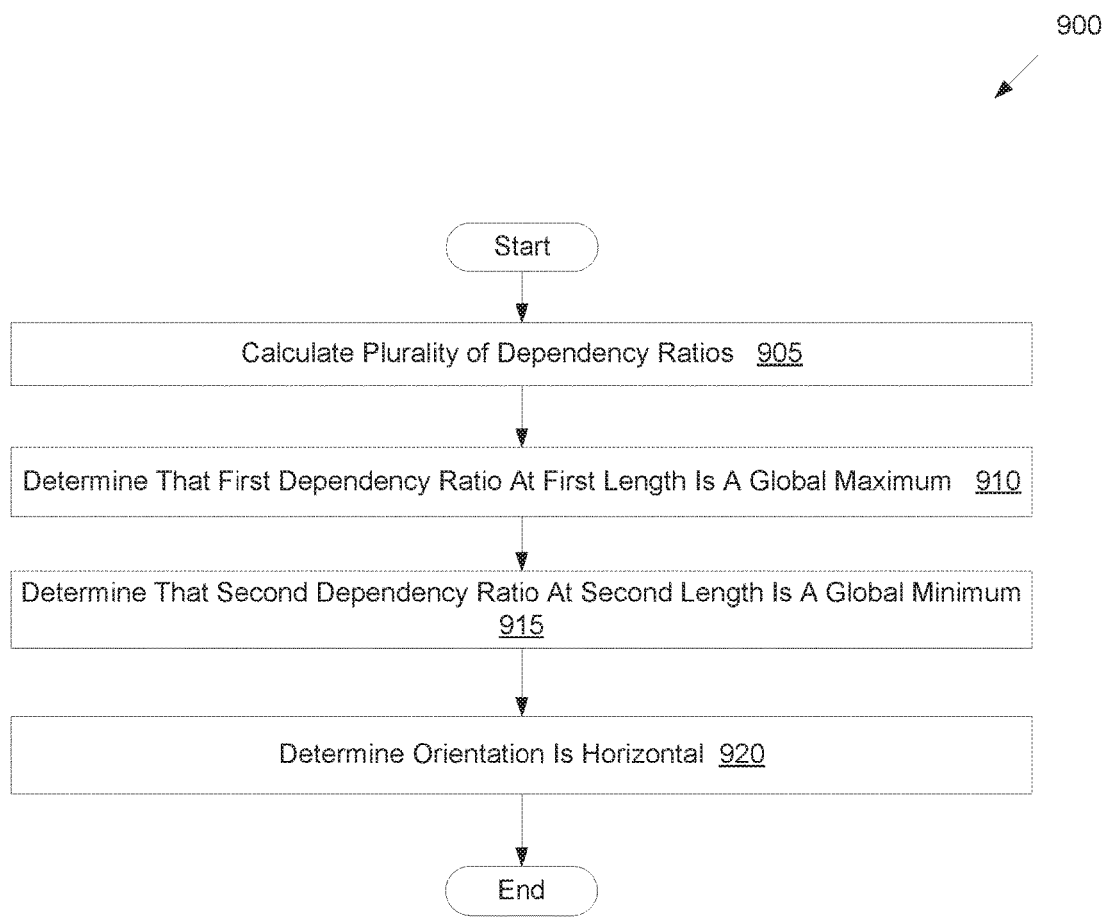
FIG. 9 depicts a flow diagram of a method for determining horizontal orientation of rows of textual content using dependency ratios, in accordance with one or more aspects of the present disclosure.

FIG. 9 depicts a flow diagram of an example method 900 for determining horizontal orientation of rows of textual content using dependency ratios. The method may be performed by processing logic that may comprise hardware (circuitry, dedicated logic, etc.), software (such as is run on a general purpose computer system or a dedicated machine), or a combination of both. In one illustrative example, method 900 may be performed by page orientation module 190 in FIG. 1. Alternatively, some or all of method 900 might be performed by another module or machine. It should be noted that blocks depicted in FIG. 9 could be performed simultaneously or in a different order than that depicted.

At block 905, processing logic calculates a plurality of additional dependency ratios. In some implementations, each dependency ratio is calculated for a corresponding additional length. In some implementations, processing logic may calculate a first dependency ratio at a first length and a second dependency ratio at a second length, where the first length is less than the second length. At block 910, processing logic determines that the first dependency ratio at the first length is a global maximum. At block 915, processing logic determines that the second dependency ratio at the second length is a global minimum. At block 920, processing logic determines that the orientation of the one or more rows of textual content is horizontal since the global maximum occurs at a shorter length than the global minimum. After block 920, the method of FIG. 9 terminates.

In some implementations, the steps of FIG. 9 are performed iteratively for each dependency ratio calculated. Once a dependency ratio is calculated at a particular run length, the global maximum and global minimum are calculated. Processing logic may then identify the next interval bin of the histogram, calculate a dependency ratio at the corresponding run length for that next interval bin, and subsequently recalculate the global maximum and global minimum taking into account the newly calculated dependency ratio. This process may be repeated until each dependency ratio is calculated for all histogram interval bins, adjusting the global maximum and global minimum each time a dependency ratio is calculated.

Figure 10:
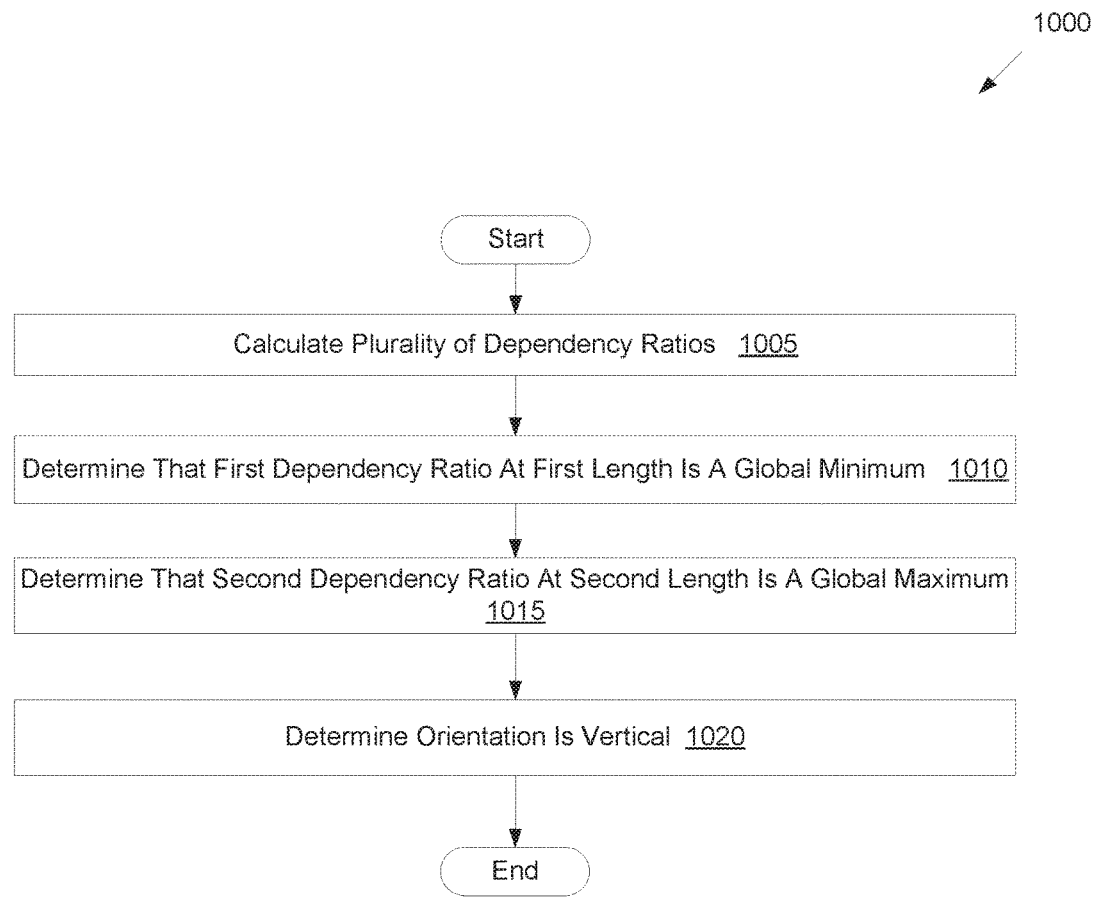
FIG. 10 depicts a flow diagram of a method for determining vertical orientation of rows of textual content using dependency ratios, in accordance with one or more aspects of the present disclosure.

FIG. 10 depicts a flow diagram of an example method 1000 for determining vertical orientation of rows of textual content using dependency ratios. The method may be performed by processing logic that may comprise hardware (circuitry, dedicated logic, etc.), software (such as is run on a general purpose computer system or a dedicated machine), or a combination of both. In one illustrative example, method 1000 may be performed by page orientation module 190 in FIG. 1. Alternatively, some or all of method 1000 might be performed by another module or machine. It should be noted that blocks depicted in FIG. 10 could be performed simultaneously or in a different order than that depicted.

At block 1005, processing logic calculates a plurality of additional dependency ratios. In some implementations, each dependency ratio is calculated for a corresponding additional length. In some implementations, processing logic may calculate a first dependency ratio at a first length and a second dependency ratio at a second length, where the first length is less than the second length. At block 1010, processing logic determines that the first dependency ratio at the first length is a global minimum. At block 1015, processing logic determines that the second dependency ratio at the second length is a global maximum. At block 920, processing logic determines that the orientation of the one or more rows of textual content is vertical since the global minimum occurs at a shorter length than the global maximum. After block 920, the method of FIG. 9 terminates.

Figure 11:
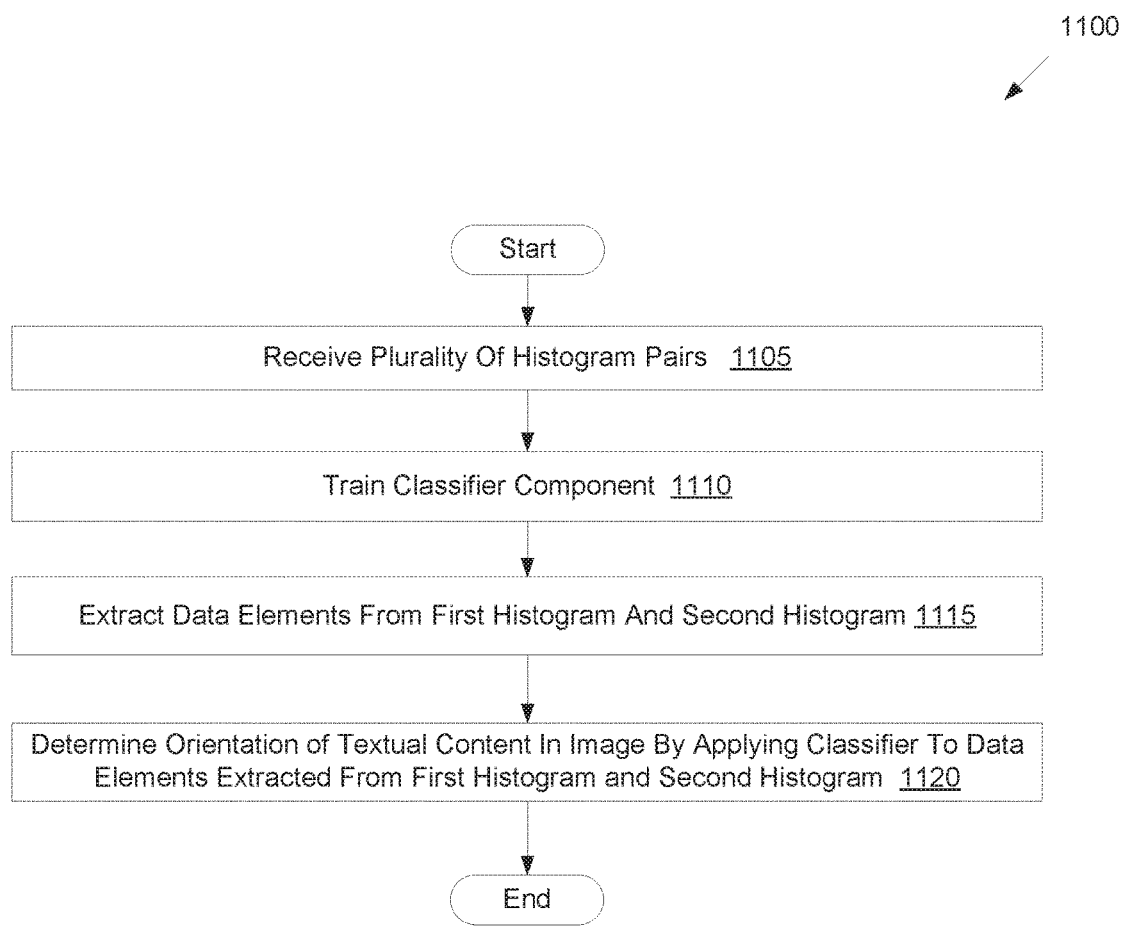
FIG. 11 depicts a flow diagram of a method for determining orientation of rows of textual content using a classifier component, in accordance with one or more aspects of the present disclosure.

In some implementations, the steps of FIG. 10 are performed iteratively for each dependency ratio calculated. Once a dependency ratio is calculated at a particular run length, the global maximum and global minimum are calculated. Processing logic may then identify the next interval bin of the histogram, calculate a dependency ratio at the corresponding run length for that next interval bin, and subsequently recalculate the global maximum and global minimum taking into account the newly calculated dependency ratio. This process may be repeated until each dependency ratio is calculated for all histogram interval bins, adjusting the global maximum and global minimum each time a dependency ratio is calculated FIG. 11 depicts a flow diagram of an example method 1100 for determining orientation of rows of textual content using a classifier component. The method may be performed by processing logic that may comprise hardware (circuitry, dedicated logic, etc.), software (such as is run on a general purpose computer system or a dedicated machine), or a combination of both. In one illustrative example, method 1100 may be performed by page orientation module 190 in FIG. 1. Alternatively, some or all of method 1100 might be performed by another module or machine. It should be noted that blocks depicted in FIG. 11 could be performed simultaneously or in a different order than that depicted.

At block 1105, processing logic receives a plurality of histogram pairs. In some implementations, each histogram pair includes a histogram for horizontal runs of white pixels and a histogram for vertical runs of white pixels. In some implementations, each histogram pair is associated with a document orientation. At block 1110, processing logic trains a classifier component by associating one or more data elements from the plurality of histogram pairs with a corresponding document orientation. In some implementations, the data elements can include at least one of an interval bin value, a dependency ratio, an area ratio, or a difference between a maximum area and a minimum area. At block 1115, processing logic extracts one or more data elements from the first histogram and the second histogram for the binarized image. At block 1120, processing logic determines the orientation of the rows of textual content in the image by applying the classifier to the data elements extracted from the first histogram and the second histogram at block 1115. After block 1120, the method of FIG. 11 terminates.

Figure 12:
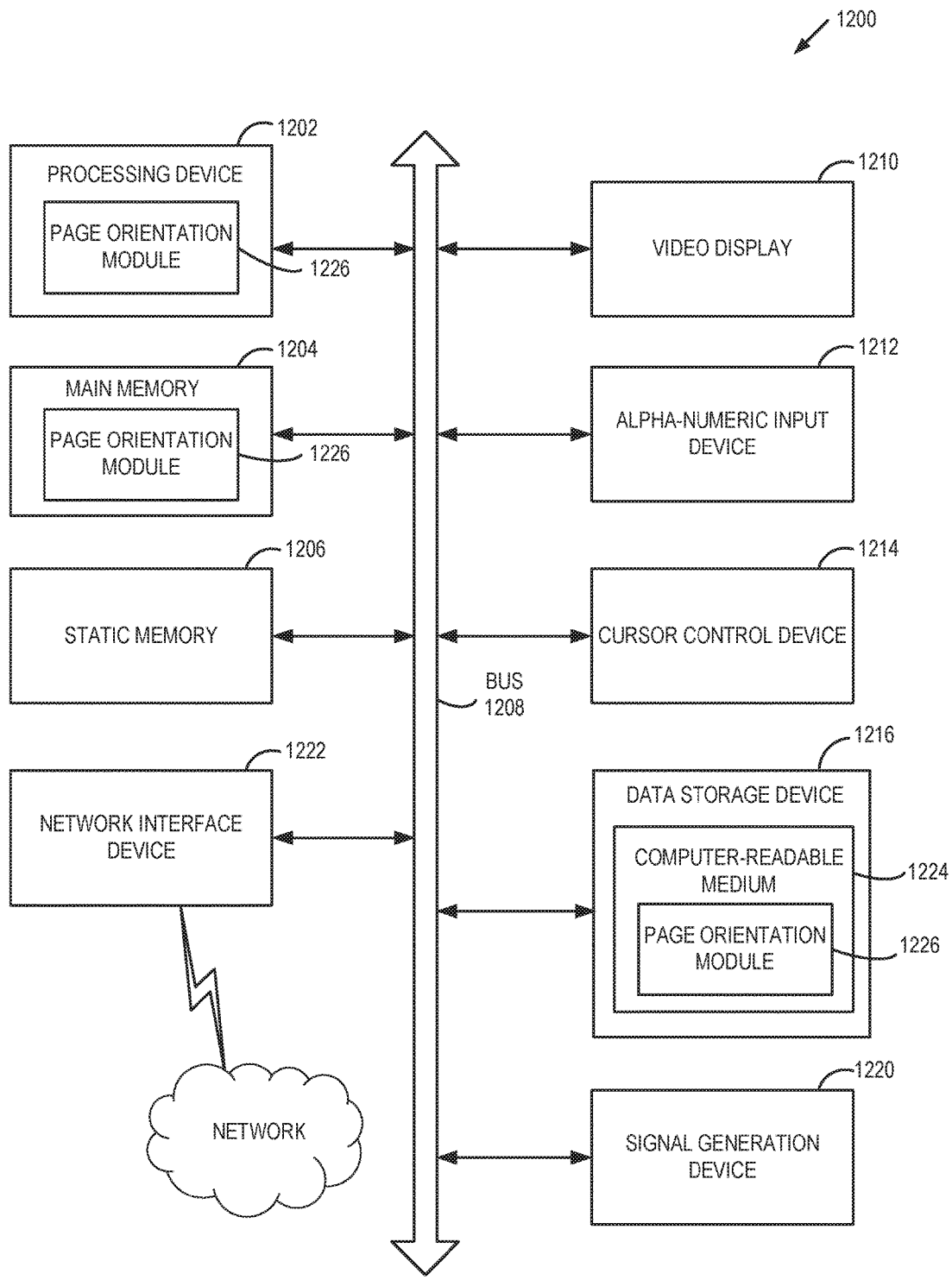
FIG. 12 depicts a block diagram of an illustrative computer system operating in accordance with examples of the present disclosure.

FIG. 12 depicts an example computer system 1200 which can perform any one or more of the methods described herein. In one example, computer system 1200 may correspond to computing device 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 1200 includes a processing device 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)), and a data storage device 1216, which communicate with each other via a bus 1208.

Processing device 1202 represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor, or the like. The processing device 1202 is configured to page orientation module 1226 for performing the operations and steps discussed herein (e.g., corresponding to the methods of FIGS. 4-11, etc.).

The computer system 1200 may further include a network interface device 1222. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1220 (e.g., a speaker). In one illustrative example, the video display unit 1210, the alphanumeric input device 1212, and the cursor control device 1214 may be combined into a single component or device (e.g., an LCD touch screen).

The data storage device 1216 may include a computer-readable medium 1224 on which is stored page orientation module 1226 (e.g., corresponding to the methods of FIGS. 4-11, etc.) embodying any one or more of the methodologies or functions described herein. Page orientation module 1226 may also reside, completely or at least partially, within the main memory 1204 and/or within the processing device 1202 during execution thereof by the computer system 1200, the main memory 1204 and the processing device 1202 also constituting computer-readable media. Page orientation module 1226 may further be transmitted or received over a network via the network interface device 1222.

While the computer-readable storage medium 1224 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "transforming," "identifying," "generating," "determining," "calculating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   receiving, by a processing device, an image of a document;
   transforming the image to a binarized image by performing a binarization operation on the image;
   identifying a portion of the binarized image that comprises one or more rows of textual content;
   identifying a plurality of horizontal runs of white pixels in the one or more rows of textual content in the portion of the binarized image, and a plurality of vertical runs of white pixels in the one or more rows of textual content in the portion of the binarized image;
   generating a first histogram for the plurality of horizontal runs of white pixels, and a second histogram for the plurality of vertical runs of white pixels; and
   determining, by the processing device, an orientation of the one or more rows of textual content in the image based on the first histogram and the second histogram.

2. The method of claim 1 further comprising:
   transforming the image to a normalized image by reducing a size of the image to a predetermined size.

3. The method of claim 1, wherein the first histogram comprises a first plurality of interval bins that each correspond to a length of one or more of the plurality of horizontal runs of white pixels, and wherein the second histogram comprises a second plurality of interval bins that each correspond to a length of one or more of the plurality of vertical runs of white pixels.

4. The method of claim 3, wherein determining the orientation of the one or more rows of textual content comprises:
   selecting a first set of interval bins from the first plurality of interval bins, wherein the first set of interval bins comprises horizontal runs of white pixels that are less than or equal to a threshold length;
   calculating a first area of the first set of interval bins from the first histogram;
   selecting a second set of interval bins from the second plurality of interval bins, wherein the second set of interval bins comprises vertical runs of white pixels that are less than or equal to the threshold length; and
   calculating a second area of the second set of interval bins from the second histogram.

5. The method of claim 4, further comprising:
   comparing the first area to the second area;
   responsive to determining that the first area is greater than the second area, setting a maximum area to the first area, and setting a minimum area to the second area;
   responsive to determining that the second area is greater than the first area, setting the maximum area to the second area, and setting the minimum area to the first area;
   calculating an area ratio by dividing the maximum area by the minimum area; and
   responsive to determining that the area ratio exceeds a confidence threshold, determining the orientation of the one or more rows of textual content in the image based on the maximum area.

6. The method of claim 5, wherein determining the orientation of the one or more rows of textual content in the image based on the maximum area comprises:
   responsive to determining that the first area is greater than the second area, determining that the orientation of the one or more rows of textual content is horizontal; and
   responsive to determining that the second area is greater than the first area, determining that the orientation of the one or more rows of textual content is vertical.

7. The method of claim 5, further comprising:
   responsive to determining that the area ratio is less than the confidence threshold:
   increasing the threshold length;
   recalculating the first area using the increased threshold length;
   recalculating the second area using the increased threshold length;
   comparing the recalculated first area to the recalculated second area;
   determining a new maximum area and a new minimum area based on the recalculated first area and the recalculated second area;
   recalculating the area ratio based on the new maximum area and the new minimum area; and
   responsive to determining that the recalculated area ratio exceeds the confidence threshold, determining the orientation of the one or more rows of textual content in the image based on the new maximum area.

8. The method of claim 3, wherein determining the orientation of the one or more rows of textual content comprises:
selecting a first set of interval bins from the first plurality of interval bins, wherein the first set of interval bins comprises horizontal runs of white pixels that are less than or equal to a first length;
calculating a first area of the first set of interval bins from the first histogram;
selecting a second set of interval bins from the second plurality of interval bins, wherein the second set of interval bins comprises vertical runs of white pixels that are less than or equal to the first length;
calculating a second area of the second set of interval bins from the second histogram;
calculating a first dependency ratio for the first length by dividing the first area by the second area;
selecting a third set of interval bins from the first plurality of interval bins, wherein the third set of interval bins comprises horizontal runs of white pixels that are less than or equal to a second length;
calculating a third area of the third set of interval bins from the first histogram;
selecting a fourth set of interval bins from the second plurality of interval bins, wherein the fourth set of interval bins comprises vertical runs of white pixels that are less than or equal to the second length;
calculating a fourth area of the fourth set of interval bins from the second histogram; and
calculating a second dependency ratio for the second length by dividing the third area by the fourth area.

9. The method of claim 8, wherein the first length is less than the second length, the method further comprising:
calculating a plurality of additional dependency ratios wherein each additional dependency ratio is calculated for a corresponding additional length; and
responsive to determining that the first dependency ratio at the first length is a global maximum for the additional plurality of dependency ratios, and the second dependency ratio at the second length is a global minimum for the additional plurality of dependency ratios, determining that the orientation of the one or more rows of textual content is horizontal.

10. The method of claim 8, wherein the first length is less than the second length, the method further comprising:
calculating a plurality of additional dependency ratios, wherein each additional dependency ratio is calculated for a corresponding additional length; and
responsive to determining that the first dependency ratio at the first length is a global minimum for the additional plurality of dependency ratios, and the second dependency ratio at the second length is a global maximum for the additional plurality of dependency ratios determining that the orientation of the one or more rows of textual content is vertical.

11. The method of claim 3, wherein determining the orientation of the one or more rows of textual content comprises:
receiving a plurality of histogram pairs, wherein each histogram pair comprises a histogram for horizontal runs of white pixels and a histogram for vertical runs of white pixels, and wherein each histogram pair is associated with a document orientation;
training a classifier component by associating one or more data elements from the plurality of histogram pairs with a corresponding document orientation;
extracting the one or more data elements from the first histogram and the second histogram; and
determining the orientation of the one or more rows of textual content in the image by applying the classifier to the data elements extracted from the first histogram and the second histogram.

12. The method of claim 11, wherein the one or more data elements comprise at least one of an interval bin value, a dependency ratio, an area ratio, or a difference between a maximum area and a minimum area.

13. The method of claim 1, wherein identifying the portion of the binarized image that comprises one or more rows of textual content comprises:
identifying a perimeter area along the perimeter of the binarized image that meets a threshold width value; and
selecting the portion of the binarized image that excludes the perimeter area.

14. The method of claim 13, wherein identifying the perimeter area comprises:
training a classifier component by associating a set of predetermined perimeter values with corresponding image characteristics;
identifying the image characteristics associated with the binarized image; and
determining the perimeter area of the binarized image by applying the classifier to image characteristics associated with the binarized image.

15. The method of claim 1, further comprising:
applying a run-length encoding (RLE) data compression algorithm to the portion of the binarized image.

16. A computing apparatus comprising:
a memory to store instructions; and
a processing device, operatively coupled to the memory, to execute the instructions, wherein the processing device is to:
receive, by a processing device, an image of a document;
transform the image to a binarized image by performing a binarization operation on the image;
identify a portion of the binarized image that comprises one or more rows of textual content;
identify a plurality of horizontal runs of white pixels in the one or more rows of textual content in the portion of the binarized image, and a plurality of vertical runs of white pixels in the one or more rows of textual content in the portion of the binarized image;
generate a first histogram for the plurality of horizontal runs of white pixels, and a second histogram for the plurality of vertical runs of white pixels; and
determine, by the processing device, an orientation of the one or more rows of textual content in the image based on the first histogram and the second histogram.

17. The computing apparatus of claim 16, wherein the processing device is further to:
transform the image to a normalized image by reducing a size of the image to a predetermined size.

18. The computing apparatus of claim 16, wherein the first histogram comprises a first plurality of interval bins that each correspond to a length of one or more of the plurality of horizontal runs of white pixels, and wherein the second histogram comprises a second plurality of interval bins that each correspond to a length of one or more of the plurality of vertical runs of white pixels.

19. The computing apparatus of claim 18, wherein to determine the orientation of the one or more rows of textual content, the processing device is to:

select a first set of interval bins from the first plurality of interval bins, wherein the first set of interval bins comprises horizontal runs of white pixels that are less than or equal to a threshold length;
calculate a first area of the first set of interval bins from the first histogram;
select a second set of interval bins from the second plurality of interval bins, wherein the second set of interval bins comprises vertical runs of white pixels that are less than or equal to the threshold length; and
calculate a second area of the second set of interval bins from the second histogram.

20. The computing apparatus of claim 19, wherein the processing device is further to:
compare the first area to the second area;
responsive to determining that the first area is greater than the second area, set a maximum area to the first area, and setting a minimum area to the second area;
responsive to determining that the second area is greater than the first area, set the maximum area to the second area, and setting the minimum area to the first area;
calculate an area ratio by dividing the maximum area by the minimum area; and
responsive to determining that the area ratio exceeds a confidence threshold, determine the orientation of the one or more rows of textual content in the image based on the maximum area.

21. The computing apparatus of claim 20, wherein to determine the orientation of the one or more rows of textual content in the image based on the maximum area the processing device is to:
responsive to determining that the first area is greater than the second area, determine that the orientation of the one or more rows of textual content is horizontal; and
responsive to determining that the second area is greater than the first area, determine that the orientation of the one or more rows of textual content is vertical.

22. The computing apparatus of claim 20, wherein the processing device is further to:
responsive to determining that the area ratio is less than the confidence threshold:
increase the threshold length;
recalculate the first area using the increased threshold length;
recalculate the second area using the increased threshold length;
compare the recalculated first area to the recalculated second area;
determine a new maximum area and a new minimum area based on the recalculated first area and the recalculated second area;
recalculate the area ratio based on the new maximum area and the new minimum area; and
responsive to determining that the recalculated area ratio exceeds the confidence threshold, determine the orientation of the one or more rows of textual content in the image based on the new maximum area.

23. The computing apparatus of claim 18, wherein to determine the orientation of the one or more rows of textual content, the processing device is to:
select a first set of interval bins from the first plurality of interval bins, wherein the first set of interval bins comprises horizontal runs of white pixels that are less than or equal to a first length;
calculate a first area of the first set of interval bins from the first histogram;
select a second set of interval bins from the second plurality of interval bins, wherein the second set of interval bins comprises vertical runs of white pixels that are less than or equal to the first length;
calculate a second area of the second set of interval bins from the second histogram;
calculate a first dependency ratio for the first length by dividing the first area by the second area;
select a third set of interval bins from the first plurality of interval bins, wherein the third set of interval bins comprises horizontal runs of white pixels that are less than or equal to a second length;
calculate a third area of the third set of interval bins from the first histogram;
select a fourth set of interval bins from the second plurality of interval bins, wherein the fourth set of interval bins comprises vertical runs of white pixels that are less than or equal to the second length;
calculate a fourth area of the fourth set of interval bins from the second histogram; and
calculate a second dependency ratio for the second length by dividing the third area by the fourth area.

24. The computing apparatus of claim 23, wherein the first length is less than the second length, wherein the processing device is further to:
calculate a plurality of additional dependency ratios wherein each additional dependency ratio is calculated for a corresponding additional length; and
responsive to determining that the first dependency ratio at the first length is a global maximum for the additional plurality of dependency ratios, and the second dependency ratio at the second length is a global minimum for the additional plurality of dependency ratios, determine that the orientation of the one or more rows of textual content is horizontal.

25. The computing apparatus of claim 23, wherein the first length is less than the second length, wherein the processing device is further to:
calculate a plurality of additional dependency ratios, wherein each additional dependency ratio is calculated for a corresponding additional length; and
responsive to determining that the first dependency ratio at the first length is a global minimum for the additional plurality of dependency ratios, and the second dependency ratio at the second length is a global maximum for the additional plurality of dependency ratios determine that the orientation of the one or more rows of textual content is vertical.

26. The computing apparatus of claim 18, wherein to determine the orientation of the one or more rows of textual content the processing device is to:
receive a plurality of histogram pairs, wherein each histogram pair comprises a histogram for horizontal runs of white pixels and a histogram for vertical runs of white pixels, and wherein each histogram pair is associated with a document orientation;
train a classifier component by associating one or more data elements from the plurality of histogram pairs with a corresponding document orientation;
extract the one or more data elements from the first histogram and the second histogram; and
determine the orientation of the one or more rows of textual content in the image by applying the classifier to the data elements extracted from the first histogram and the second histogram.

27. The computing apparatus of claim 26, the one or more data elements comprise at least one of an interval bin value, a dependency ratio, an area ratio, or a difference between a maximum area and a minimum area.

28. The computing apparatus of claim 16, wherein to identify the portion of the binarized image that comprises one or more rows of textual content the processing device is to:
identify a perimeter area along the perimeter of the binarized image that meets a threshold width value; and
select the portion of the binarized image that excludes the perimeter area.

29. The computing apparatus of claim 28, wherein to identify the perimeter area the processing device is to:
train a classifier component by associating a set of predetermined perimeter values with corresponding image characteristics;
identify the image characteristics associated with the binarized image; and
determine the perimeter area of the binarized image by applying the classifier to image characteristics associated with the binarized image.

30. The computing apparatus of claim 16, wherein the processing device is further to:
apply a run-length encoding (RLE) data compression algorithm to the portion of the binarized image.

31. A non-transitory computer readable storage medium, having instructions stored therein, which when executed by a processing device of a computer system, cause the processing device to perform operations comprising:
receiving, by a processing device, an image of a document;
transforming the image to a binarized image by performing a binarization operation on the image;
identifying a portion of the binarized image that comprises one or more rows of textual content;
identifying a plurality of horizontal runs of white pixels in the one or more rows of textual content in the portion of the binarized image, and a plurality of vertical runs of white pixels in the one or more rows of textual content in the portion of the binarized image;
generating a first histogram for the plurality of horizontal runs of white pixels, and a second histogram for the plurality of vertical runs of white pixels; and
determining, by the processing device, an orientation of the one or more rows of textual content in the image based on the first histogram and the second histogram.

32. The non-transitory computer readable storage medium of claim 31, the operations further comprising:
transforming the image to a normalized image by reducing a size of the image to a predetermined size.

33. The non-transitory computer readable storage medium of claim 31, wherein the first histogram comprises a first plurality of interval bins that each correspond to a length of one or more of the plurality of horizontal runs of white pixels, and wherein the second histogram comprises a second plurality of interval bins that each correspond to a length of one or more of the plurality of vertical runs of white pixels.

34. The non-transitory computer readable storage medium of claim 33, wherein determining the orientation of the one or more rows of textual content comprises:
selecting a first set of interval bins from the first plurality of interval bins, wherein the first set of interval bins comprises horizontal runs of white pixels that are less than or equal to a threshold length;
calculating a first area of the first set of interval bins from the first histogram;
selecting a second set of interval bins from the second plurality of interval bins, wherein the second set of interval bins comprises vertical runs of white pixels that are less than or equal to the threshold length; and
calculating a second area of the second set of interval bins from the second histogram.

35. The non-transitory computer readable storage medium of claim 34, the operations further comprising:
comparing the first area to the second area;
responsive to determining that the first area is greater than the second area, setting a maximum area to the first area, and setting a minimum area to the second area;
responsive to determining that the second area is greater than the first area, setting the maximum area to the second area, and setting the minimum area to the first area;
calculating an area ratio by dividing the maximum area by the minimum area; and
responsive to determining that the area ratio exceeds a confidence threshold, determining the orientation of the one or more rows of textual content in the image based on the maximum area.

36. The non-transitory computer readable storage medium of claim 35, wherein determining the orientation of the one or more rows of textual content in the image based on the maximum area comprises:
responsive to determining that the first area is greater than the second area, determining that the orientation of the one or more rows of textual content is horizontal; and
responsive to determining that the second area is greater than the first area, determining that the orientation of the one or more rows of textual content is vertical.

37. The non-transitory computer readable storage medium of claim 35, the operations further comprising:
responsive to determining that the area ratio is less than the confidence threshold:
increasing the threshold length;
recalculating the first area using the increased threshold length;
recalculating the second area using the increased threshold length;
comparing the recalculated first area to the recalculated second area;
determining a new maximum area and a new minimum area based on the recalculated first area and the recalculated second area;
recalculating the area ratio based on the new maximum area and the new minimum area; and
responsive to determining that the recalculated area ratio exceeds the confidence threshold, determining the orientation of the one or more rows of textual content in the image based on the new maximum area.

38. The non-transitory computer readable storage medium of claim 33, wherein determining the orientation of the one or more rows of textual content comprises:
selecting a first set of interval bins from the first plurality of interval bins, wherein the first set of interval bins comprises horizontal runs of white pixels that are less than or equal to a first length;
calculating a first area of the first set of interval bins from the first histogram;
selecting a second set of interval bins from the second plurality of interval bins, wherein the second set of interval bins comprises vertical runs of white pixels that are less than or equal to the first length;

calculating a second area of the second set of interval bins from the second histogram;

calculating a first dependency ratio for the first length by dividing the first area by the second area;

selecting a third set of interval bins from the first plurality of interval bins, wherein the third set of interval bins comprises horizontal runs of white pixels that are less than or equal to a second length;

calculating a third area of the third set of interval bins from the first histogram;

selecting a fourth set of interval bins from the second plurality of interval bins, wherein the fourth set of interval bins comprises vertical runs of white pixels that are less than or equal to the second length;

calculating a fourth area of the fourth set of interval bins from the second histogram; and calculating a second dependency ratio for the second length by dividing the third area by the fourth area.

39. The non-transitory computer readable storage medium of claim 38, wherein the first length is less than the second length, the method further comprising:

calculating a plurality of additional dependency ratios wherein each additional dependency ratio is calculated for a corresponding additional length; and responsive to determining that the first dependency ratio at the first length is a global maximum for the additional plurality of dependency ratios, and the second dependency ratio at the second length is a global minimum for the additional plurality of dependency ratios, determining that the orientation of the one or more rows of textual content is horizontal.

40. The non-transitory computer readable storage medium of claim 38, wherein the first length is less than the second length, the method further comprising:

calculating a plurality of additional dependency ratios, wherein each additional dependency ratio is calculated for a corresponding additional length; and responsive to determining that the first dependency ratio at the first length is a global minimum for the additional plurality of dependency ratios, and the second dependency ratio at the second length is a global maximum for the additional plurality of dependency ratios determining that the orientation of the one or more rows of textual content is vertical.

41. The non-transitory computer readable storage medium of claim 33, wherein determining the orientation of the one or more rows of textual content comprises:

receiving a plurality of histogram pairs, wherein each histogram pair comprises a histogram for horizontal runs of white pixels and a histogram for vertical runs of white pixels, and wherein each histogram pair is associated with a document orientation;

training a classifier component by associating one or more data elements from the plurality of histogram pairs with a corresponding document orientation;

extracting the one or more data elements from the first histogram and the second histogram; and determining the orientation of the one or more rows of textual content in the image by applying the classifier to the data elements extracted from the first histogram and the second histogram.

42. The non-transitory computer readable storage medium of claim 41, wherein the one or more data elements comprise at least one of an interval bin value, a dependency ratio, an area ratio, or a difference between a maximum area and a minimum area.

43. The non-transitory computer readable storage medium of claim 41, wherein identifying that the portion of the binarized image comprises one or more rows of textual content comprises:

identifying a perimeter area along the perimeter of the binarized image that meets a threshold width value; and selecting the portion of the binarized image that excludes the perimeter area.

44. The non-transitory computer readable storage medium of claim 43, wherein identifying the perimeter area comprises:

training a classifier component by associating a set of predetermined perimeter values with corresponding image characteristics;

identifying the image characteristics associated with the binarized image; and determining the perimeter area of the binarized image by applying the classifier to image characteristics associated with the binarized image.

45. The non-transitory computer readable storage medium of claim 31, the operations further comprising:

applying a run-length encoding (RLE) data compression algorithm to the portion of the binarized image.

* * * * *